US 9,283,968 B2

(12) United States Patent
Yamada

(10) Patent No.: US 9,283,968 B2
(45) Date of Patent: Mar. 15, 2016

(54) DRIVING MODEL CREATING APPARATUS AND DRIVING SUPPORT APPARATUS

(75) Inventor: Yuki Yamada, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 499 days.

(21) Appl. No.: 13/698,335

(22) PCT Filed: Jun. 8, 2010

(86) PCT No.: PCT/JP2010/059715
§ 371 (c)(1),
(2), (4) Date: Nov. 16, 2012

(87) PCT Pub. No.: WO2011/155030
PCT Pub. Date: Dec. 15, 2011

(65) Prior Publication Data
US 2013/0066611 A1    Mar. 14, 2013

(51) Int. Cl.
*G06F 7/60* (2006.01)
*G06F 17/10* (2006.01)
*B60W 50/00* (2006.01)
*B60W 30/18* (2012.01)

(52) U.S. Cl.
CPC ..... *B60W 50/0098* (2013.01); *B60W 30/18145* (2013.01); *B60W 30/18154* (2013.01); *B60W 2050/0089* (2013.01)

(58) Field of Classification Search
CPC .................. B60W 50/0098; B60W 30/18145; B60W 2050/0089; B60W 30/18154
USPC .................. 703/2, 6–8; 701/1, 30.2
See application file for complete search history.

(56) References Cited

U.S. PATENT DOCUMENTS

| 5,864,771 A | 1/1999 | Yokoyama et al. |
| 5,913,375 A | 6/1999 | Nishikawa |

(Continued)

FOREIGN PATENT DOCUMENTS

| DE | 19635009 A1 | 3/1997 |
| DE | 102006033458 A1 | 1/2007 |

(Continued)

OTHER PUBLICATIONS

International Search Report for PCT/JP2010/059715 dated Jul. 13, 2010.

(Continued)

*Primary Examiner* — Eunhee Kim
(74) *Attorney, Agent, or Firm* — Sughrue Mion, PLLC

(57) ABSTRACT

Provided is a driving model creating apparatus that can create a more desirable driving model for practical use, even when creating the driving model on the basis of driving track records, and a driving support apparatus that can execute a more appropriate driving support based on the driving model. The driving model creating apparatus creates a driving model for indicating the driving state of a vehicle (10). The driving model creating apparatus creates the driving model on the basis of road information that is information related to the driving environment of the vehicle (10), and driving information that is information related to the driving state of the vehicle, which will change as a result of a driver's driving operation. The driving model creating apparatus also makes the contribution ratio of the driving information with respect to the driving model to be created, to be variable in accordance with the road information.

9 Claims, 9 Drawing Sheets

(56) References Cited

U.S. PATENT DOCUMENTS

| | | |
|---|---|---|
| 7,194,347 B2 | 3/2007 | Harumoto et al. |
| 8,538,619 B2 | 9/2013 | Syed et al. |
| 2002/0040265 A1 | 4/2002 | Sadano et al. |
| 2002/0128751 A1 | 9/2002 | Engstrom et al. |
| 2003/0050742 A1 | 3/2003 | Sakamoto et al. |
| 2005/0159851 A1 | 7/2005 | Engstrom et al. |
| 2006/0122749 A1 | 6/2006 | Phelan et al. |
| 2006/0293819 A1 | 12/2006 | Harumoto et al. |
| 2007/0010933 A1 | 1/2007 | Hochkirchen et al. |
| 2007/0017735 A1 | 1/2007 | Kataoka et al. |
| 2008/0004806 A1 | 1/2008 | Kimura et al. |
| 2008/0059036 A1 | 3/2008 | Imai et al. |
| 2009/0082917 A1 | 3/2009 | Adachi |
| 2009/0088941 A1 | 4/2009 | Tsuchiya et al. |
| 2009/0234552 A1 | 9/2009 | Takeda et al. |
| 2009/0306880 A1 | 12/2009 | Gomi et al. |
| 2010/0030397 A1 | 2/2010 | Tachibana et al. |
| 2010/0076621 A1* | 3/2010 | Kubotani et al. .............. 701/1 |
| 2010/0100284 A1 | 4/2010 | Kudo et al. |
| 2010/0209890 A1 | 8/2010 | Huang et al. |
| 2010/0211247 A1* | 8/2010 | Sherony .................. 701/29 |
| 2010/0238009 A1 | 9/2010 | Cook et al. |
| 2010/0274435 A1 | 10/2010 | Kondoh et al. |
| 2010/0305921 A1* | 12/2010 | Hashimoto et al. ............ 703/2 |
| 2011/0208399 A1 | 8/2011 | Fekete et al. |
| 2012/0133497 A1 | 5/2012 | Sasaki |
| 2012/0203399 A1* | 8/2012 | Filev et al. .................... 701/1 |
| 2013/0013164 A1 | 1/2013 | Taguchi |
| 2013/0054049 A1 | 2/2013 | Uno |
| 2013/0073122 A1 | 3/2013 | Hoshiya |

FOREIGN PATENT DOCUMENTS

| | | |
|---|---|---|
| DE | 102006050214 A1 | 5/2007 |
| DE | 102009044269 A1 | 4/2010 |
| JP | 2005-202512 A | 7/2005 |
| JP | 2006-344032 A | 12/2006 |
| JP | 2008-74231 A | 4/2008 |
| JP | 2009-134496 A | 6/2009 |
| JP | 2009-237937 A | 10/2009 |
| WO | 2011/145165 A1 | 11/2011 |

OTHER PUBLICATIONS

Translation of International Preliminary Report on Patentability issued in corresponding International Patent Application PCT/JP2010/059715 on Jan. 15, 2013.

Communication dated May 22, 2014, issued by the United States Patent and Trademark Office in corresponding U.S. Appl. No. 13/496,248.

* cited by examiner

Intersection List 50

| Intersection | Intersection Category | Individual Driving Model |
|---|---|---|
| C1 | CT1 | MC1 |
| C2 | CT2 | MC2 |
| C3 | CT1 | MC3 |
| C4 | CT3 | MC4 |
| C5 | CT3 | MC5 |
| C6 | CT1 | MC6 |
| ... | ... | ... |

Intersection Data (C1) 51A

| Positional Information | A10 |
|---|---|
| Traffic Light Information | B10 |
| Lane Number Information | C10 |
| Stop Line Information | D10 |
| Center Mark Information | E10 |
| Pedestrian Crossing Information | F10 |
| Right-Turn Auxiliary Line Information | G10 |
| ... | ... |

Fig.6(a)

Individual Driving Model (MC1)

| Item | Value |
|---|---|
| Deceleration Start Position | DC11 |
| Deceleration End Position | DC21 |
| Acceleration Start Position | AC11 |
| Acceleration End Position | AC21 |
| Steering Start Position | ST11 |
| Steering Return-Start Position | ST21 |
| Steering Return-End Position | ST31 |
| Deceleration (Average) | DA1 |
| Acceleration (Average) | AA1 |
| Lateral G (Lateral Acceleration:Average) | CA1 |
| Approaching Speed | SP1 |
| ... | ... |

Fig.6(b)

Normative Driving Model (MCs)

| Item | Value |
|---|---|
| Deceleration Start Position | DC1s |
| Deceleration End Position | DC2s |
| Acceleration Start Position | AC1s |
| Acceleration End Position | AC2s |
| Steering Start Position | ST1s |
| Steering Return-Start Position | ST2s |
| Steering Return-End Position | ST3s |
| Deceleration (Average) | DAs |
| Acceleration (Average) | AAs |
| Lateral G (Lateral Acceleration:Average) | CAs |
| Approaching Speed | SPs |
| ... | ... |

Fig.6(c)

General Driving Model (MCu)

| Item | Value |
|---|---|
| Deceleration Start Position | DC1u |
| Deceleration End Position | DC2u |
| Acceleration Start Position | AC1u |
| Acceleration End Position | AC2u |
| Steering Start Position | ST1u |
| Steering Return-Start Position | ST2u |
| Steering Return-End Position | ST3u |
| Deceleration (Average) | DAu |
| Acceleration (Average) | AAu |
| Lateral G (Lateral Acceleration:Average) | CAu |
| Approaching Speed | SPu |
| ... | ... |

Fig.6(d)

Calculated Driving Model (MCx)

| Item | Value |
|---|---|
| Deceleration Start Position | DC1x |
| Deceleration End Position | DC2x |
| Acceleration Start Position | AC1x |
| Acceleration End Position | AC2x |
| Steering Start Position | ST1x |
| Steering Return-Start Position | ST2x |
| Steering Return-End Position | ST3x |
| Deceleration (Average) | DAx |
| Acceleration (Average) | AAx |
| Lateral G (Lateral Acceleration:Average) | CAx |
| Approaching Speed | SPx |
| ... | ... |

Fig.13(a)           Fig.13(b)
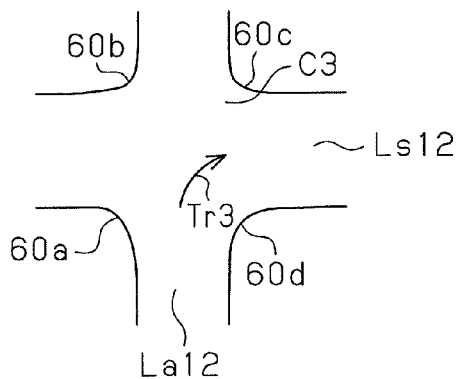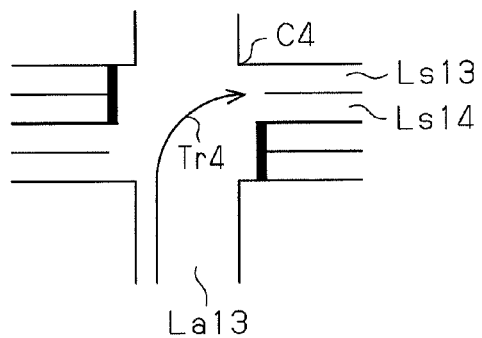
Fig.14
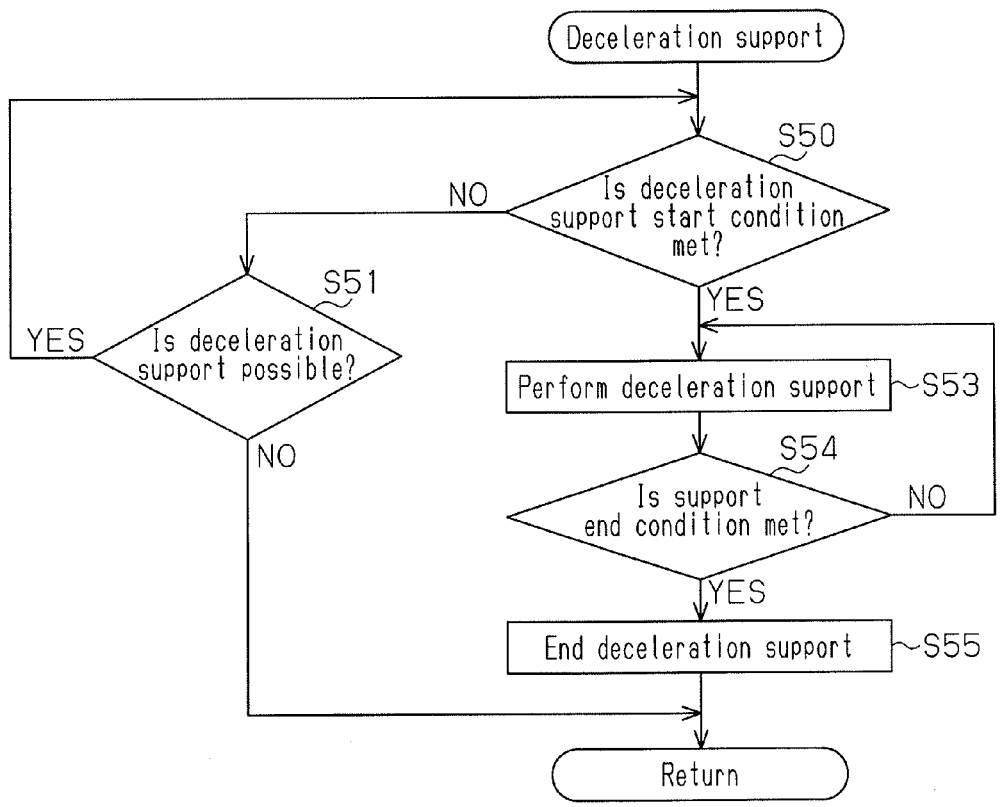

Fig.15
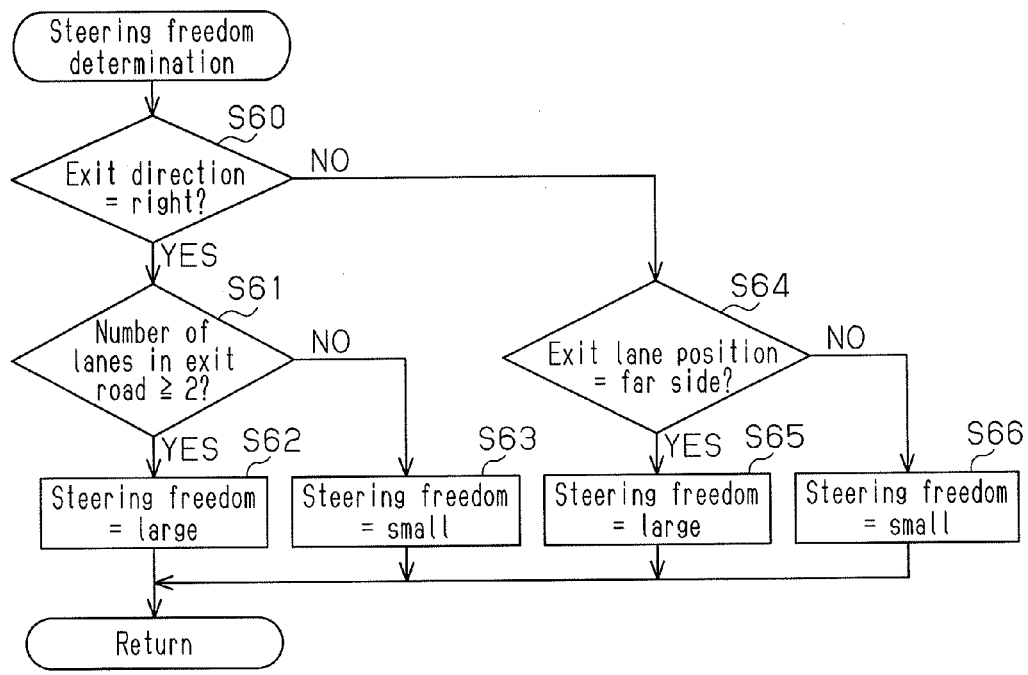
Fig.16
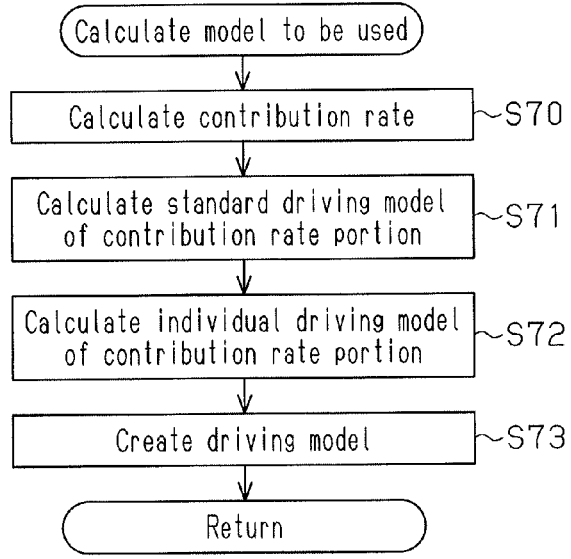
Fig.17

DRIVING MODEL CREATING APPARATUS AND DRIVING SUPPORT APPARATUS

CROSS REFERENCE TO RELATED APPLICATIONS

This application is a National Stage of International Application No. PCT/JP2010/059715 filed Jun. 8, 2010, the contents of which are incorporated herein by reference in their entirety.

FIELD OF THE DISCLOSURE

The present invention relates to a driving model creating apparatus for creating a vehicle driving model suitable for use in driving support for supporting a driving operation of a vehicle by a driver and to a driving support apparatus which performs driving support on the basis of a driving model.

BACKGROUND OF THE DISCLOSURE

A driving support apparatus has been known, which supports a driving operation of a vehicle by a driver by indicating information such as a driving environment of a vehicle and road situation, for example, to the driver of the vehicle. As one of such driving support performed by this type of driving support apparatuses, driving support for indicating information or a warning relating to a curve in front, for example, is known.

If such driving support for indicating information or a warning relating to a curve is not provided appropriately in accordance with an ever-changing driving environment, the support might even become a nuisance to the driver. Thus, various technologies for appropriately providing such driving support have been proposed. In a driving support apparatus in Patent Document 1, for example, a vehicle state when passing through a curve in front of a vehicle is estimated on the basis of a current position of the vehicle, information of the curve in front of the vehicle, and a current vehicle state. Also, a vehicle state when the vehicle passed a curve at the maximum acceleration, for example, in the stored past vehicle states when passing through a curve is used as an allowable vehicle state (driving model) for when the driver passes through the curve. Then, by determining whether or not the driving support is to be performed in the curve in front on the basis of the estimated vehicle state when passing through a curve in front of the vehicle and the allowable vehicle state (driving model) when the driver passes the curve, the driving support is appropriately provided to the driver.

PRIOR ART DOCUMENT

Patent Document

Patent Document 1
Japanese Laid-Open Patent Publication No. 2008-74231

SUMMARY OF THE INVENTION

Problems that the Invention is to Solve

The determination in Patent Document 1 on whether or not the driving support apparatus is to perform the driving support in the front curve is made on the basis of the allowable vehicle state (driving model) when the driver passed through a curve in the past. Thus, suitability of the selected allowable vehicle state (driving model) when the driver passes through the curve may influence the determination result. That is, if a vehicle state on the basis of a peculiar driving state, for example, is included in the vehicle states of the past curve passages and if the peculiar driving state is selected as the allowable vehicle state (driving model) of the driver's curve passage, it is likely that the determination is not made appropriately. As described above, there still remains room for improvement in practice for driving support performed in accordance with a complicated driving environment.

Accordingly, it is an objective of the present invention to provide a driving model creating apparatus capable of creating a desirable driving model in practical use even if a driving model is created on the basis of driving history, and a driving support apparatus capable of performing more appropriate driving support on the basis of the driving model.

Means for Solving the Problems

To achieve the foregoing objective, the present invention provides a driving model creating apparatus for creating a driving model indicating a driving state of a vehicle. The apparatus creates the driving model on the basis of road information, which is information relating to the driving environment of the vehicle, and driving information, which is information relating to changes in the driving state of the vehicle as a result of a driving operation of a driver. A model contribution rate of the driving information, which is a contribution rate of the driving information to the driving model to be created, is made variable in accordance with the road information.

According to the above-described configuration, a driving model is created on the basis of the road information and driving information for which a model contribution rate is made variable in accordance with this road information. As a result, in a driving environment determined to be not suitable for creation of a driving model since a driving operation by a driver is largely fluctuated, for example, it becomes possible not to reflect driving information in the driving model to be created or to reduce the degree of influence of the driving information by lowering the contribution rate of the driving information in the driving model even if it is reflected. That is, the driving model can be created as a more appropriate model according to the driving environment of the vehicle. Moreover, by using the driving model created as above for driving support, more preferable driving support is performed.

The driving model creating apparatus may be configured such that the model contribution rate of the driving information when information relating to a road marking on a road surface is not included in the road information is configured to be smaller than the model contribution rate of the driving information when the information relating to the road marking is included in the road information.

If there is a road marking on the road surface, a driver usually performs a driving operation of a vehicle by referring to the road marking. Thus, the driving state of the vehicle tends to become stable, and the driving information as information relating to the driving state reflects the stable driving state. In contrast, if there is no road marking on the road surface, the driver performs the driving operation of the vehicle mainly on the basis of his/her own senses. Thus, the driving state of the vehicle tends to be unstable, and the driving information as information relating to the driving state reflects the unstable driving state.

In this regard, according to the above-described configuration, if there is no road marking on the road surface, the driving model is created such that the contribution rate, that is, the influence of the driving information on the driving model becomes small. As a result, accuracy and reliability of the driving model to be created is also improved. By using such driving model with high reliability for driving support, more preferable driving support can be performed.

The driving model creating apparatus may be configured such that the model contribution rate of the driving information is configured to be reduced when the road information indicates a driving environment in which freedom in a steering operation by the driver is small and the difference between the driving model selected as corresponding to the driving environment and the driving information is small.

If freedom in a steering operation is small such as when a road width is small, for example, the driver usually performs the driving operation of the vehicle within a limited steering operation range and thus, the driving operation of the vehicle tends to be stable. That is, the difference in the driving information as information relating to the driving state generated between the driving operations is small.

Thus, as according to this configuration, if the freedom in the steering operation is small and if the difference between the driving model selected as the one corresponding to the driving environment and the driving information is small, the driving model is created by making the model contribution rate by the driving information small. As a result, the driving model in which accuracy and the like are already maintained is not affected by the driving information more than necessary. Therefore, accuracy and reliability of the driving model to be created is maintained. By using such highly reliable driving model for driving support, suitable driving support can be performed.

Particularly, if the model contribution rate of the driving information is set to 0 (zero), the driving information is not allowed to contribute to creation of the driving model. Thus, calculation process for the creation of the driving model is reduced. Moreover, if the driving model on the basis of the driving information is not actually created, a storage region for storing the created driving model can be reduced or the like.

The road information may be information relating to an intersection.

According to the above-described configuration, a highly practical driving model is suitably created for an intersection where there is a high possibility among various road environments that stability or uncertainty of the driving state of the vehicle is largely fluctuated by the driving operation of the driver. For example, by making the model contribution rate of the driving information small when the information relating to the road marking on the road surface is not included in the road information, the driving model created for this intersection is given high accuracy and high reliability. Moreover, by setting the model contribution rate of the driving information variable when it is indicated that the freedom in steering operation by the driver is small, the accuracy and reliability of the driving model for the intersection are maintained, and calculation for creation of the driving model and the like can be reduced.

By using the driving model created as above for an intersection, driving support suitable for the driving environment of each intersection can be performed.

To achieve the foregoing objective, the present invention also provides a driving support apparatus for supporting a driving operation of a driver of a vehicle on the basis of a driving model indicating a driving state of the vehicle. The apparatus uses, as the driving model, a model created by the above described model creating apparatus.

According to the above-described configuration, driving support using the suitably created driving model is performed. As a result, the suitable driving support can be performed.

To achieve the foregoing objective, the present invention provides a driving support apparatus for supporting a driving operation of a driver of a vehicle on the basis of a driving model indicating a driving state of the vehicle. The driving model is created on the basis of changes in the vehicle driving state as a result of the driving operation of the driver. A support contribution rate of the driving model, which is a contribution rate of the driving model to the driving support, is made variable on the basis of road information, which is information indicating the vehicle driving environment.

According to the above-described configuration, since the support contribution rate of the driving model depending on the driving operation of the driver is made variable on the basis of the road information, which is information indicating a driving environment of the vehicle, the form of the driving support is changed in accordance with the road information, that is, the driving environment of the vehicle. Thus, in the driving environment in which a burden of the driver tends to be large since there is no stop line or intersection mark, that is, in the driving environment greatly requiring driving support, the support contribution rate of the driving model can be made larger and in the driving environment requiring little driving support, the support contribution rate of the driving model can be made smaller. As a result, the degree of influence of the driving model in the driving support can be changed in accordance with the driving environment of the vehicle, and even if the driving support is performed on the basis of the driving model, the freedom thereof can be improved.

The driving support apparatus may be configured such that the support contribution rate of the driving model when information relating to a road marking on a road surface is not included in the road information is configured to be smaller than the support contribution rate of the driving model when the information relating to the road marking is included in the road information.

If there is a road marking on the road surface, the driver usually performs a driving operation of the vehicle by referring to the road marking. Thus, the driving state of the vehicle tends to be stable, and the driving model indicating the driving state of the vehicle also reflects the stable driving state since it is created on the basis of the driving operation of the driver. In contrast, if there is no road marking on the road surface, the driver performs the driving operation of the vehicle on the basis of his/her own senses. Thus, the driving state of the vehicle tends to be unstable, and the driving model indicating the driving state of the vehicle also reflects the unstable driving state since it is created on the basis of the driving operation of the driver.

In this regard, according to the above-described configuration, if there is no road marking on the road surface, the support contribution rate of the driving model is reduced, that is, the driving support is performed such that the influence is reduced. As a result, stability of the driving support is improved, and further suitable driving support can be performed.

The driving support apparatus may be configured such that, when the information relating to the road marking on the road surface is not included in the road information, the driving support is configured to be provided on the basis of a standard driving model prepared in advance.

As according to this configuration, if there is no road marking on the road surface, the driving support in which predetermined stability is maintained is performed by performing the driving support on the basis of the standard driving model prepared in advance. As a result, stability of driving support is suitably maintained.

The driving support apparatus may be configured such that the support contribution rate of the driving model when the road information indicates a driving environment in which freedom of a steering operation by a driver is small is configured to be smaller than that when the support contribution rate of the driving model indicates a driving environment in which the freedom of the steering operation is large.

If freedom in a steering operation is small such as when the road width is small, for example, the driver usually performs the driving operation of the vehicle within a limited steering operation range. Thus, the driving operation of the vehicle tends to be stable, and the difference generated in the driving state of the vehicle is small between the driving operations. In contrast, if freedom of the steering operation is large such as when the road width is large, for example, the driver performs the driving operation of the vehicle freely within a wide steering operation range. Thus, the driving state of the vehicle tends to be unstable, and it is highly likely that a large difference is generated in the driving state of the vehicle between the driving operations.

Thus, as according to this configuration, if the freedom of the steering operation is small, the driving support is performed so that the support contribution rate of the driving model at that time, that is, the influence of the driving model is reduced. As a result, if the driving operation of the vehicle by the driver becomes stable since the freedom in the steering operation is small, the driving support is performed in the form such that the support is not felt as a nuisance to the driving operation of the driver. That is, suitable driving support is performed for the driver.

The driving support apparatus may be configured such that, when the road information indicates a driving environment in which the freedom of the steering operation by the driver is small, the driving support is provided on the basis of a standard driving model prepared in advance.

As according to this configuration, if the freedom of the steering operation is small, that is, if a difference generated in the driving state is small between the driving operations, stable driving support without characteristics unique to the driver is provided by performing the driving support on the basis of the standard driving model prepared in advance.

The road information may be information relating to an intersection.

According to the above-described configuration, in various types of road information, the driving support on the basis of the driving model depending on the driving operation of the driver can be suitably provided even for an intersection where there is a high possibility that stability of the driving state of the vehicle might be largely fluctuated by the driving operation of the driver.

BRIEF DESCRIPTION OF THE DRAWINGS

FIG. 6 is diagram showing a list exemplifying a vehicle state (driving model) corresponding to the intersection included in the map information of the first embodiment, in which section (a) is a diagram showing a list exemplifying the driving model learned for the intersection, section (b) is a diagram showing a list exemplifying a normative driving model of the intersection, section (c) is a diagram showing a list exemplifying a general driving model of the intersection, and section (d) is a diagram showing a list exemplifying a driving model calculated from information of the intersection;

FIG. 13(*a*) is a plan view of a third intersection, which exemplifies a form of steering freedom;

FIG. 13(*b*) is a plan view of a fourth intersection, which exemplifies a form of steering freedom;

FIG. 14 is a flowchart showing a procedure of deceleration support in the driving support of FIG. 11;

FIG. 15 is a plan view exemplifying a fifth intersection where driving support is performed by a driving support apparatus according to a third embodiment of the present invention;

FIG. 16 is a flowchart showing the procedure for determining the steering freedom in the third embodiment; and FIG. 17 is a flowchart showing a procedure of driving support performed by a driving support apparatus according to another embodiment of the present invention.

DETAILED DESCRIPTION OF THE PREFERRED EMBODIMENTS (First Embodiment)

Figure 1:
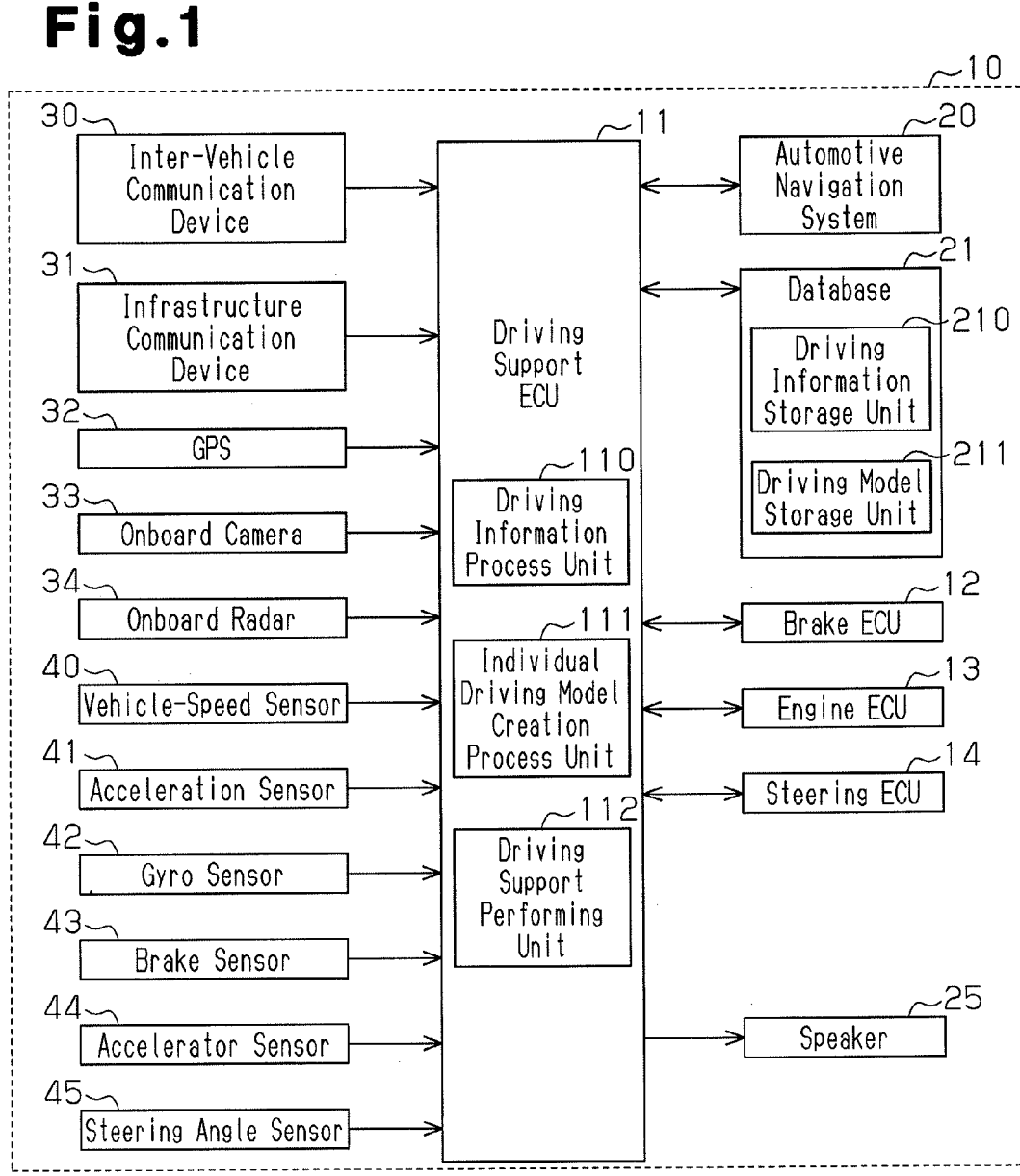
FIG. 1 is a block diagram showing the system configuration of a driving support apparatus according to a first embodiment of the present invention.
Figure 2:
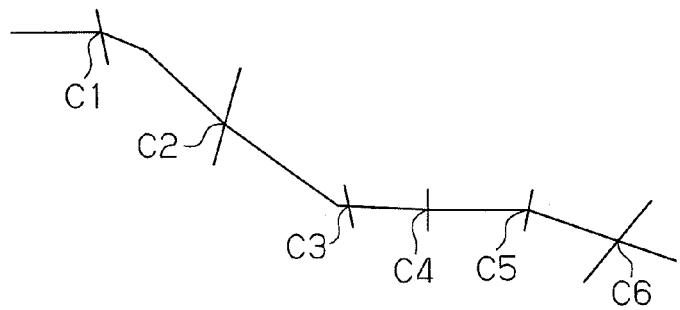
FIG. 2 is a plan view schematically showing map information including a plurality of intersections used in the apparatus in the first embodiment.

A driving support apparatus according to a first embodiment of the present invention will be described below by referring to FIGS. 1 to 10. FIG. 1 is a diagram showing a configuration of the driving support apparatus by each block.

As shown in FIG. 1, a vehicle 10 has a driving support control computer (driving support ECU) 11 for executing various controls and the like for supporting a driving operation of a driver who drives the vehicle 10. The driving support ECU 11 is mainly composed of a microcomputer provided with a CPU for executing various calculations, a ROM storing various control programs, a RAM used as a work area for data storage and program execution, an input/output interface, a memory and the like.

The driving support ECU 11 has a driving information process unit 110, an individual driving model creation process unit 111, and a driving support performing unit 112. The driving information process unit 110 executes process of temporary storage of driving information including speed, acceleration and the like indicating a state of driving detected during driving of the vehicle 10. The individual driving model creation process unit 111 executes creation process of an individual driving model, which is a driving model used for driving support and created on the basis of learning of the driving state of the vehicle in accordance with a driving operation of the driver. The individual driving model creation process unit 111 executes creation process of the individual driving model through process of selecting whether or not to use the driving state of the vehicle for learning and learning process of learning the driving state of the vehicle selected for learning by a known learning method and reflecting the learned result in the individual driving model. The driving support performing unit 112 executes various controls relating to driving support, particularly to right-turning support performed when the vehicle 10 turns right at an intersection. The driving support includes various forms such as information provision performed through sound, voice, images and the like, warnings, braking control such as preliminary braking and assist brake and the like. As such, the driving support is performed in one or more forms selected from these forms.

That is, the driving support ECU 11 stores various programs for temporary storage of the driving information, for executing creation process of the individual driving model, and for performing the driving support, and various parameters used for calculation process of the above-described various programs in advance.

The driving support ECU 11 is connected to a brake control computer (brake ECU) 12 executing brake control or the like of the vehicle 10 and an engine control computer (engine ECU) 13 executing engine control or the like of the vehicle 10 through an onboard network such as CAN (Control Area Network), capable of communication with each of them. Moreover, the driving support ECU 11 is also connected to a steering control computer (steering ECU) 14 executing steering control or the like of the vehicle 10 through the onboard network such as CAN, capable of communication. Each of the above-described ECUs 12 to 14 is mainly composed of a microcomputer provided with a CPU for executing various calculation processes, a ROM storing various control programs, a RAM used as a work area for data storage and program execution, an input/output interface, a memory and the like similarly to the driving support ECU 11.

The brake ECU 12 is an ECU for executing control of a brake device of the vehicle 10, to which various sensors such as a vehicle-speed sensor 40, a brake sensor 43 and the like are connected to the brake ECU 12. The brake ECU 12 generates a braking force in the vehicle 10 through control of the brake device of the vehicle 10 on the basis of signals from the various sensors. Specifically, the brake ECU 12 controls the brake device by calculating a speed of the vehicle 10 grasped on the basis of a signal from the vehicle-speed sensor 40 and a braking force required on the basis of a signal such as a brake pedal depression amount of the brake sensor 43 and the like. In this embodiment, the brake ECU 12 is configured to execute braking control for supporting deceleration or stopping of the vehicle 10 such as preliminary braking or assist brake, for example, on the basis of a deceleration support signal for the driving support sent from the driving support ECU 11.

The engine ECU 13 is an ECU for executing engine driving control of the vehicle 10, to which an accelerator sensor 44 for detecting an accelerator pedal depression amount. A sensor for detecting an intake air amount and the like are connected, and driving circuits of various devices such as a driving circuit of a throttle valve, a driving circuit of a fuel injection valve and the like are connected to the engine ECU 13. The engine ECU 13 detects an engine driving state and the like grasped on the basis of a detection signal input from each of the above-described sensors and outputs an instruction signal for the driving circuit of the above-described various devices. As such, the engine driving control is executed through the engine ECU 13.

The steering ECU 14 is an ECU for executing steering control of the vehicle 10 to which various sensors such as a gyro sensor 42. A steering angle sensor 45 and the like are connected to the steering ECU 14. The steering ECU 14 executes steering control by electric assist control or the like on the basis of signals from the various sensors.

Moreover, the driving support ECU 11 is connected to an automotive navigation system 20 and a database 21 for storing various types of information such as road map information and a driving model capable of reading/writing through the onboard network such as CAN capable of communication, respectively.

The automotive navigation system 20 detects the current position of the vehicle using Global Positioning System (GPS) and the like and guides the driver through a driving path and the like of the vehicle 10 to a driving destination by referring to the road map information stored in advance. The automotive navigation system 20 is provided with a display device, an input device, and a sound device, not shown.

The display device is composed of a liquid crystal display, for example, and is installed in the vicinity of a center console in a passenger compartment. An image corresponding to image data input from the automotive navigation system 20 and the like is displayed on this display device. As a result, the automotive navigation system 20 displays an image in which the position of the vehicle 10 and the map around it are combined on the display device by outputting image data in which the current position of the vehicle 10 and the map around it are combined. The display device receives image data of map display and image data such as warning display corresponding to the information input from the driving support ECU 11 for drawing attention of the driver (driving support signal) and the like from the automotive navigation system 20.

For the input device, a touch switch or a mechanical switch and the like integral with the display device, for example, is used for various input operations. In this embodiment, the driver can be set in the driving support ECU 11 through this input/output device. Moreover, a standard driving model employed instead of the individual driving model can be selected and set from a plurality of driving models.

The sound device is a device for generating sound or voice and outputs sound or voice corresponding to sound/sound data and the like input from the automotive navigation system 20. To the sound device, sound information such as path guidance and traffic information, and sound information corresponding to the information from the driving support ECU 11 and the like are input as sound/voice data from the automotive navigation system 20.

The automotive navigation system 20 of this embodiment obtains and uses road map information stored in the database 21. Moreover, the automotive navigation system 20 sends positional information relating to the position of the vehicle 10, road map information extracted as information of the periphery of the current position and the like to the driving support ECU 11.

The database 21 is a device storing various types of information such as road map information (map database) used for navigation process, various driving models and the like, and an HDD (Hard Disk Drive) which is a nonvolatile storage device is used as a storing device.

The road map information is information relating to a map and is composed of data for displaying roads and backgrounds of road maps, data composed of names of intersections and the like. Moreover, the road map information includes information pertaining to roads such as information of the shapes of the roads, intersections and pedestrian crossings on roads and the like. The information pertaining to roads includes intersection data, which is data of intersections, and the intersection data includes information such as positions, presence of traffic lights, positions of stop lines, road shapes of intersecting roads, pedestrian crossings, road markings on the road surfaces and the like. The road map information stores road map information, which is driving environments including intersections C1 to C6 shown in FIG. 2 and intersection data relating to those intersections, for example.

An outline structure of a first intersection C1 will be described by referring to FIG. 4.

Figures 3, 4, 5:
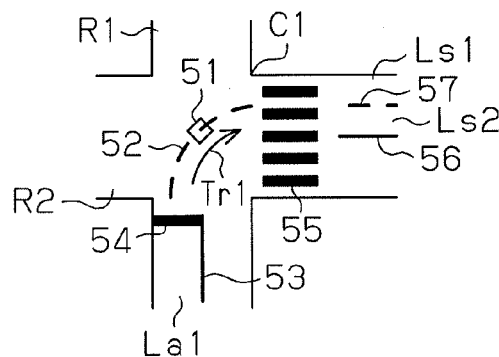
FIG. 3 is a diagram showing a list exemplifying information of an intersection included in the map information of the first embodiment.
FIG. 4 is a plan view showing an example of a first intersection where a driving model is learned in the apparatus of the first embodiment.
FIG. 5 is a diagram showing a list exemplifying situation information of the intersection included in the map information of the first embodiment.

As shown in FIG. 4, the first intersection C1 has a structure where two roads, a first road R1 extending in the vertical direction in FIG. 4 and a second road R2 extending in the horizontal direction in FIG. 4 intersect. In the first road R1 in the vertical direction, a first vertical driving lane coming down from the top and a second vertical driving lane formed of one lane La1 going up from the bottom are provided, while in the second road R2 in the horizontal direction, a first horizontal driving lane going from right to left and a second horizontal driving lane having two lanes Ls1 and Ls2 going from left to right are provided. That is, the second horizontal driving lane has a lane Ls1 close to a road shoulder and a lane Ls2 close to the center. Moreover, in this first intersection C1, a plurality of road markings are provided. That is, an intersection mark 51 is provided at the center part of the first intersection C1, and a right-turn auxiliary line 52 is provided from the lane La1 of the first road R1 to the two lanes Ls1 and Ls2 of the second road R2 is provided. Moreover, the lane La1 of the first road R1 has a center line 53 and a stop line 54, and the second road R2 has a pedestrian crossing 55, a center line (solid line) 56, and a traffic lane line 57 defining the lanes Ls1 and Ls2.

In the road map information, intersection data 51A as shown in FIG. 5 is set for the first intersection C1 having the above-described structure. In the intersection data 51A, positional information A10 specifying the position of the first intersection C1 on the map, traffic signal information B10 indicating presence of a traffic light and the like, lane information C10 indicating the number of lanes on the roads R1 and R2 and the like, and stop line information D10 indicating the position of the stop line 54 and the like are set. Moreover, in the intersection data 51A, center mark information E10 indicating presence of the intersection mark 51 of the intersection and the like, pedestrian crossing information F10 indicating presence of the pedestrian crossing 55 and the like, and right-turn auxiliary line information G10 indicating presence of the right-turn auxiliary line 52 are set. Moreover, in the intersection data 51A, presence of the center line 53 (56) in each of the roads R1 and R2, the traffic lane line 57 and the like may be set.

As such, the road map information sent from the automotive navigation system 20 to the driving support ECU 11 also includes the above-described information pertaining to the road and the like.

Moreover, the road map information is associated with the intersection list 50 as shown in FIG. 3. The intersection list 50 associates intersection categories and driving models to intersections, and the intersection list 50 associates the intersection category, an individual driving model and the like to each of the intersections C1 to C6. The intersection categories indicate a category classified by probability of driving support performed by the same driving model. That is, since the intersection category is given a value so as to classify the intersections according to the shape, structure and the like, the intersections having similar shapes, structures and the like are given the same value. As a result, driving support on the basis of the same driving model can be used for the intersections having the same intersection category value. The individual driving model is data that can be employed as a basis of a driving state of the vehicle 10 in driving support and is provided in correspondence with each of the intersections C1 to C6 as driving environments.

For example, in the intersection list 50, the first intersection C1 is associated with the intersection category value CT1 and the individual driving model MC1. Similarly, the second intersection C2 is associated with the intersection category value CT2 and the individual driving model MC2, the third intersection C3 is associated with the intersection category value CT1 and the individual driving model MC3, and the fourth intersection C4 is associated with the intersection category value CT3 and the individual driving model MC4, respectively. Moreover, the fifth intersection C5 is associated with the intersection category value CT3 and the individual driving model MC5, and the sixth intersection C6 is associated with the intersection category value CT1 and the individual driving model MC6, respectively.

In this embodiment, the database 21 has a driving information storage unit 210 and a driving model storage unit 211. The driving information storage unit 210 temporarily stores driving information composed of a value detected during driving of the vehicle 10. The driving model storage unit 211 stores various driving models used for the driving support. The driving model has data corresponding to the driving information determined in accordance with the driving environment. The driving state includes elements such as a speed of the vehicle 10, the acceleration, the steering angle of the steering wheel, the position and the like. The driving information includes the value of each of the above-described elements included in the driving state as time-series data and the like. As a result, the driving support ECU 11 is capable of selecting a driving model corresponding to the driving environment subjected to the driving support and performing the driving support on the basis of the driving information included in the selected driving model.

In this embodiment, in addition to the individual driving model MC1 associated with the intersection list 50 (FIG. 6(a)), a normative driving model MCs (FIG. 6(b)), a general driving model MCu (FIG. 6(c)), and a calculated driving model MCx (FIG. 6(d)) are provided as a driving model associating the driving environment with the first intersection C1 as shown in FIG. 6. The normative driving model MCs, the general driving model MCu, and the calculated driving model MCx have similar items to those of the individual driving model MC1.

The details of the driving model will be described. The individual driving model MC1 corresponding to the first intersection C1 will be described, and duplicated description of the individual driving models corresponding to the other intersections C2 to C6 will be omitted.

The individual driving model MC1 is a driving model created according to each driver and a driving model that has been generated by learning the driving information of a target driver by a known learning method. The normative driving model MCs is a driving model prepared in advance and a driving model created from the driving information on the basis of a normative driving operation by a driver such as a professional driver, for example. The general driving model MCu is a driving model prepared in advance and is a driving model created by averaging or the like a large number of sets of the driving information obtained from driving operations by a large number of general drivers obtained in advance. The calculated driving model MCx is a driving model prepared in advance and a driving model calculated by predetermined calculation executed on the basis of data indicating a road structure and the like of the driving environment.

In this embodiment, items corresponding to elements of the driving state when turning right at an intersection, particularly to elements of the driving state of the vehicle changing as a result of a driving operation of the driver are set in the driving model. That is, the driving model has a deceleration start position, which is a position where the vehicle 10 starts deceleration to turn right, a deceleration end position to end the deceleration, an acceleration start position to start acceleration for turning right, and an acceleration end position to end the acceleration. Moreover, the driving model has a steering start position to start turning a steering wheel to right for turning right, a steering return-start position to start returning the steering wheel, which has been steered to the right, and a steering return-end position where the steering wheel has been returned. Furthermore, the driving model has an average value of deceleration (deceleration acceleration) when turning right, an average value of acceleration when turning right, an average value of lateral G (lateral acceleration) when turning right, and an approaching speed, which is the speed when approaching the intersection.

From this fact, for the individual driving model MC1 (FIG. 6($a$)), a deceleration start position DC11, a deceleration end position DC21, an acceleration start position AC11, an acceleration end position AC21, a steering start position ST11, a steering return-start position ST21, and a steering return-end position ST31 are set as values corresponding to items set for the driving model. Moreover, a deceleration average DA1, an acceleration average AA1, a lateral acceleration average CA1, and an approaching speed SP1 are set.

Moreover, for the normative driving model MCs (FIG. 6($b$)), a deceleration start position DC1$s$, a deceleration end position DC2$s$, an acceleration start position AC1$s$, an acceleration end position AC2$s$, a steering start position ST1$s$, a steering return-start position ST2$s$, and a steering return-end position ST3$s$ are set as values corresponding to the items set for the driving model with subscript "s". Moreover, a deceleration average DAs, an acceleration average AAs, a lateral acceleration average CAs, and an approaching speed SPs are set.

Moreover, for the general driving model MCu (FIG. 6($c$)), a deceleration start position DC1$u$, a deceleration end position DC2$u$, an acceleration start position AC1$u$, an acceleration end position AC2$u$, a steering start position ST1$u$, a steering return-start position ST2$u$ and a steering return-end position ST3$u$ are set as values corresponding to each of the items set for the driving model with subscript "u". Moreover, a deceleration average Dau, an acceleration average AAu, a lateral acceleration average CAu, and an approaching speed SPu are set.

Moreover, for the calculated driving model MCx (FIG. 6($d$)), a deceleration start position DC1$x$, a deceleration end position DC2$x$, an acceleration start position AC1$x$, an acceleration end position AC2$x$, a steering start position ST1$x$, a steering return-start position ST2$x$, and a steering return-end position ST3$x$ are set as values corresponding to each of the items set for the driving model with subscript "x". Moreover, a deceleration average Dax, an acceleration average AAx, a lateral acceleration average CAx, and an approaching speed SPx are set.

From the above, the road map information sent from the automotive navigation system 20 to the driving support ECU 11 includes the above-described various driving models.

The driving support ECU 11 is electrically connected to an output device (man-machine interface) for outputting various types of information such as a warning relating to driving support or a speaker 25, for example. This output device is a device that generates a warning sound for drawing attention of the driver on the basis of a warning relating to the driving support and outputs warning sound according to a signal from the driving support ECU 11. The output device is not limited to the above-described speaker.

Moreover, the driving support ECU 11 is electrically connected to various information obtaining devices such as an inter-vehicle communication device 30, an infrastructure communication device 31, a global positioning system (GPS) 32, an onboard camera 33, onboard radar 34 and the like.

The inter-vehicle communication device 30 is a communication device that performs "inter-vehicle communication", in which the device mutually transmits various types of information such as positional information and driving information of a vehicle with other vehicles located in the periphery of the vehicle 10 via wireless communication. In this inter-vehicle communication, vehicle information is periodically sent/received between each of a plurality of vehicles in a communicable area.

The infrastructure communication device 31 is a communication device that conducts communication by using optical signals such as infrared signals with optical beacon devices (not shown) provided on roads. The infrastructure communication device 31 receives an infrastructure information signal transmitted from the optical beacon device and transmits the received infrastructure information signal to the driving support ECU 11. As a result, the driving support ECU 11 can grasp the infrastructure information. For example, the infrastructure communication device 31 receives road traffic information distributed from VICS (Vehicle Information and Communication System) center as the infrastructure information through the optical beacon device. Moreover, the infrastructure information includes incidental information incidental to roads such as a road situation (including intersection shape, radius of curvature, gradient, the number of lanes and the like) of roads in the periphery of a place where the optical beacon device is installed and the like and mobile body information of other vehicles in the periphery detected by ground equipment or the like. Furthermore, the infrastructure information may include intersection data indicated by a controller of an intersection that can indicate information to the outside. That is, the driving support ECU 11 may obtain intersection data through the infrastructure communication device 31.

The GPS 32 receives a GPS satellite signal in order to detect the absolute position of the vehicle 10 and also detects the position of the vehicle 10 on the basis of the received GPS satellite signal. Moreover, the GPS 32 sends the detected positional information of the vehicle 10 to the driving support ECU 11. As a result, the driving support ECU 11 can grasp the position of the vehicle 10.

The onboard camera 33 picks up images of a predetermined range in front of the vehicle 10 by an optical CCD camera installed on the back side of a rearview mirror and the like and sends an image signal on the basis of the picked up image to the driving support ECU 11. The driving support ECU 11 extracts a state of a traffic light in front (color of a traffic light and the like) and a road marking in front (a stop line, a center line and the like) on the basis of the image signal picked up by this onboard camera 33. Then, the driving support of the vehicle 10 can be performed on the basis of the state of the traffic light in front or the road marking in front extracted as above.

The onboard radar 34 uses laser beam to detect the distance, the relative speed, the azimuth and the like from a reflecting object such as a vehicle in front and the like that reflects the laser beam. These detection results are sent to the driving support ECU 11 for each reflecting object. As a result, the driving support ECU 11 can discriminate presence and type of a mobile body such as another vehicle in front of the vehicle 10, an obstacle and the like and grasp a separation distance.

Furthermore, the driving support ECU 11 is electrically connected to various sensors such as the vehicle-speed sensor 40, an acceleration sensor 41, the gyro sensor 42, the brake sensor 43, the accelerator sensor 44, and the steering angle sensor 45.

The vehicle-speed sensor 40 detects a rotational speed of a wheel and sends a signal according to the detected rotational speed to the driving support ECU 11.

The acceleration sensor 41 detects acceleration of a vehicle and sends a signal according to the detected acceleration to the driving support ECU 11.

The gyro sensor 42 detects a vehicle traveling direction and sends a signal according to the detected traveling direction to the driving support ECU 11.

The brake sensor 43 detects presence of an operation of a brake pedal by a driver or a pedal depression amount and sends a signal according to the detected presence of the operation or the pedal depression amount to the driving support ECU 11.

The accelerator sensor 44 detects presence of an operation of an accelerator pedal by a driver or a pedal depression amount and sends a signal according to the detected presence of the operation or the pedal depression amount to the driving support ECU 11.

The steering angle sensor 45 calculates a steering angle on the basis of a change amount of the detected steering angle of the steering wheel and sends a signal according to the calculated steering angle to the driving support ECU 11.

The various signals from each of the above-described sensors are sent to the driving support ECU 11 at predetermined intervals so that the driving support ECU 11 can sequentially grasp a vehicle situation such as a position, speed, direction and the like of the vehicle 10 on the basis of the sent various signals.

Figures 7, 8:
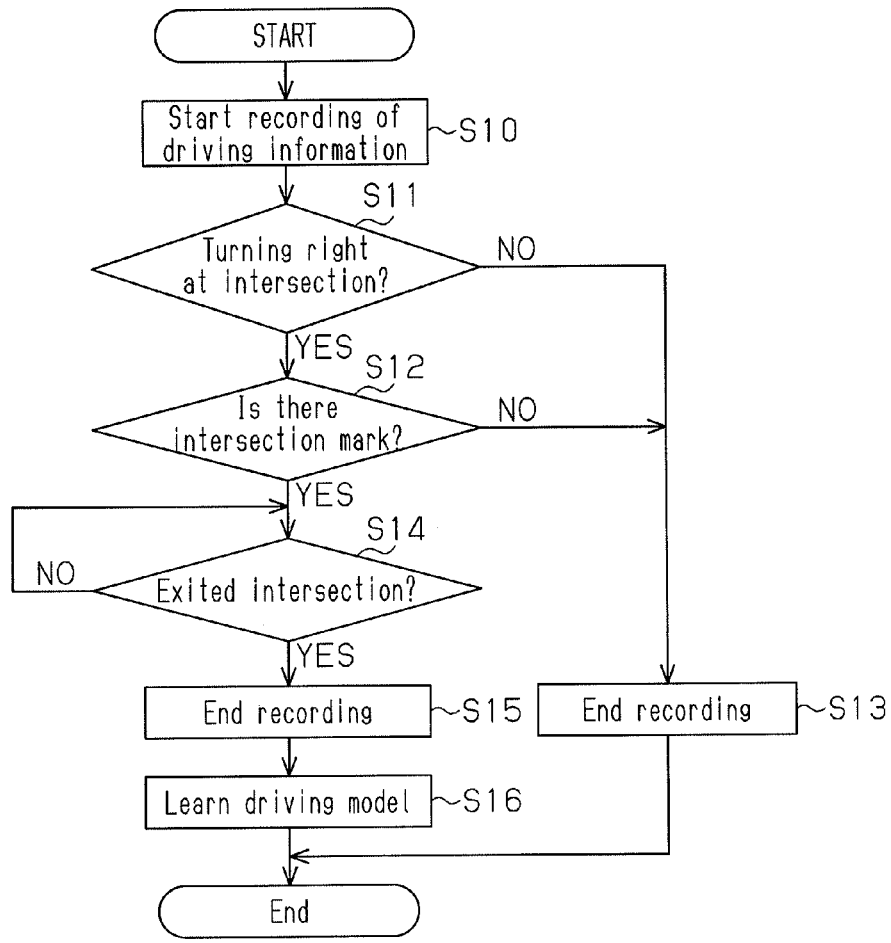
FIG. 7 is a flowchart showing a procedure for learning a driving model in the apparatus of the first embodiment.
FIG. 8 is a diagram showing a list exemplifying a case in which the driving model learned once in the apparatus of the first embodiment is further learned.

Subsequently, creation process of the individual driving model by the driving support apparatus of this embodiment will be described by referring to FIGS. 7 and 8. FIG. 7 is a flowchart showing a procedure of the creation process of the individual driving model, and FIG. 8 is a diagram of a list showing an example of the created individual driving model.

The creation process of the individual driving model is executed as appropriate when driving in a driving environment subjected to the driving model creation process or driving through each of the intersections C1 to C6, for example, with the road map information and the current position of the vehicle 10, for example. For the illustrative purposes, the creation process of the individual driving model for the first intersection C1 will be described below, and the explanation of the creation process of the individual driving model for the other intersections C2 to C6 will be omitted.

Moreover, since the individual driving model is created separately for each driver, the created individual driving model is a model adapted for driving characteristics of each driver. In the following, the creation process of the individual driving model corresponding to one driver will be described, and for the illustrative purposes, description of creation process of the individual driving models corresponding to the other drivers will be omitted.

As shown in FIG. 7, when the creation process of the individual driving model is started, the driving support ECU 11 starts storing of driving information of the vehicle 10 (Step S10 in FIG. 7). That is, the driving information is temporarily stored in a time series in the memory and the driving information storage unit 210 of the database 21 of the driving support ECU 11. Then, the driving support ECU 11 determines whether or not the vehicle 10 is to turn right at the first intersection C1 (Step S11 in FIG. 7). The determination on whether the vehicle 10 turns right at the first intersection C1 is made on the facts that a path guidance of the automotive navigation system 20 indicates a right turn, a direction indicator indicates a right turn, the vehicle usually makes a right turn on the path, deceleration is started in a driving environment in which deceleration is not necessary, a form of a driving operation of the driver resembles a standard model at a right-turn operation and the like. The driving environment in which deceleration is not necessary is determined on the basis of various types of information obtained from the onboard camera 33, the onboard radar 34, the infrastructure information, the road map information, the inter-vehicle communication and the like. In other words, the driving environment requiring deceleration is determined on the basis of the facts that a yellow traffic light or a red traffic light is on, the intersection is an intersection requiring temporary stop, the vehicle in front decelerates, the inter-vehicle distance from the vehicle in front becomes shorter and the like.

If the driving support ECU 11 determines that the vehicle 10 is not turning right at the first intersection C1 (NO at Step S11 in FIG. 7), the driving support ECU 11 ends recording of the driving state, discards the recorded driving state (Step S13 in FIG. 7) and ends the creation process of the individual driving model.

On the other hand, if the driving support ECU 11 determines that the vehicle 10 is turning right at the first intersection C1 (YES at Step S11 in FIG. 7), the driving support ECU 11 determines whether or not there is the intersection mark 51, which is a road marking at the first intersection C1 (Step S12 in FIG. 7). Whether or not there is the intersection mark 51 at the first intersection C1 is determined on the basis of various information obtained through the onboard camera 33, infrastructure information, and the road map information. If the driving support ECU 11 determines that there is no intersection mark 51 at the first intersection C1 (NO at Step S12 in FIG. 7), the driving support ECU 11 ends recording of the driving state, discards the driving state recorded (Step S13 in FIG. 7) and ends the creation process of the individual driving model.

If the driving support ECU 11 determines that there is the intersection mark at the first intersection C1 (YES at Step S12 in FIG. 7), the driving support ECU 11 determines whether or not the vehicle 10 has exited the intersection (Step S14 in FIG. 7). The determination on whether or not the vehicle 10 has exited the intersection is made on the basis of comparison between the position of the vehicle 10 and the position of the first intersection C1 on the basis of the road map information and the infrastructure information, the steering angle of the steering wheel of the vehicle 10, the speed of the vehicle 10, the recognition by means of the onboard camera 33 and the like. If the driving support ECU 11 determines that the vehicle 10 has not exited the intersection (NO at Step S14 in FIG. 7), the driving support ECU 11 periodically repeats the determination on whether or not the vehicle 10 has exited the intersection (Step S14 in FIG. 7).

Then, if the driving support ECU 11 determines that the vehicle 10 has exited the intersection (YES at Step S14 in FIG. 7), the driving support ECU 11 ends recording of the driving state of the vehicle 10 (Step S15 in FIG. 7) and performs learning of the individual driving model (Step S16 in FIG. 7). The learning of the individual driving model is performed on the basis of the recorded driving information of the vehicle 10. The driving information of the vehicle 10 is reflected in each item of the individual driving model MC1 (FIG. 6(*a*)) through the learning of the individual driving model. That is, the result of this learning is reflected in the individual driving model MC1 before the learning, and the value of each item is set to a value indicated in each item of the individual driving model MC1*a* after the learning as shown in FIG. 8, for example. Specifically, the value in each item of the individual driving model MC1 is set through the learning such that the deceleration start position DC11 is set to a deceleration start position DC11*a*, the deceleration end position DC21 to a deceleration end position DC21*a*, the acceleration start position AC11 to an acceleration start position AC11*a*, and the acceleration end position AC21 to an acceleration end position AC21*a*, respectively. Moreover, the steering start position ST11 is set to a steering start position ST11*a*, the steering return-start position ST21 to a steering return-start position ST21*a*, and the steering return-end position ST31 to a steering return-end position ST31*a*, respectively. Furthermore, the deceleration average DA1 is set to a deceleration average DA1*a*, the acceleration average AA1 to an acceleration average AA1*a*, the lateral acceleration average CA1 to a lateral acceleration average CA1*a*, and the approaching speed SP1 to an approaching speed SP1*a*, respectively.

Figure 9:
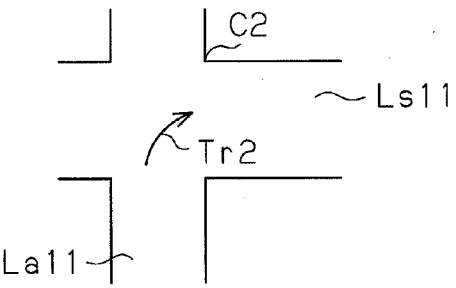
FIG. 9 is a plan view exemplifying a second intersection for which driving support based on the driving model is performed in the apparatus in the first embodiment.
Figure 10:
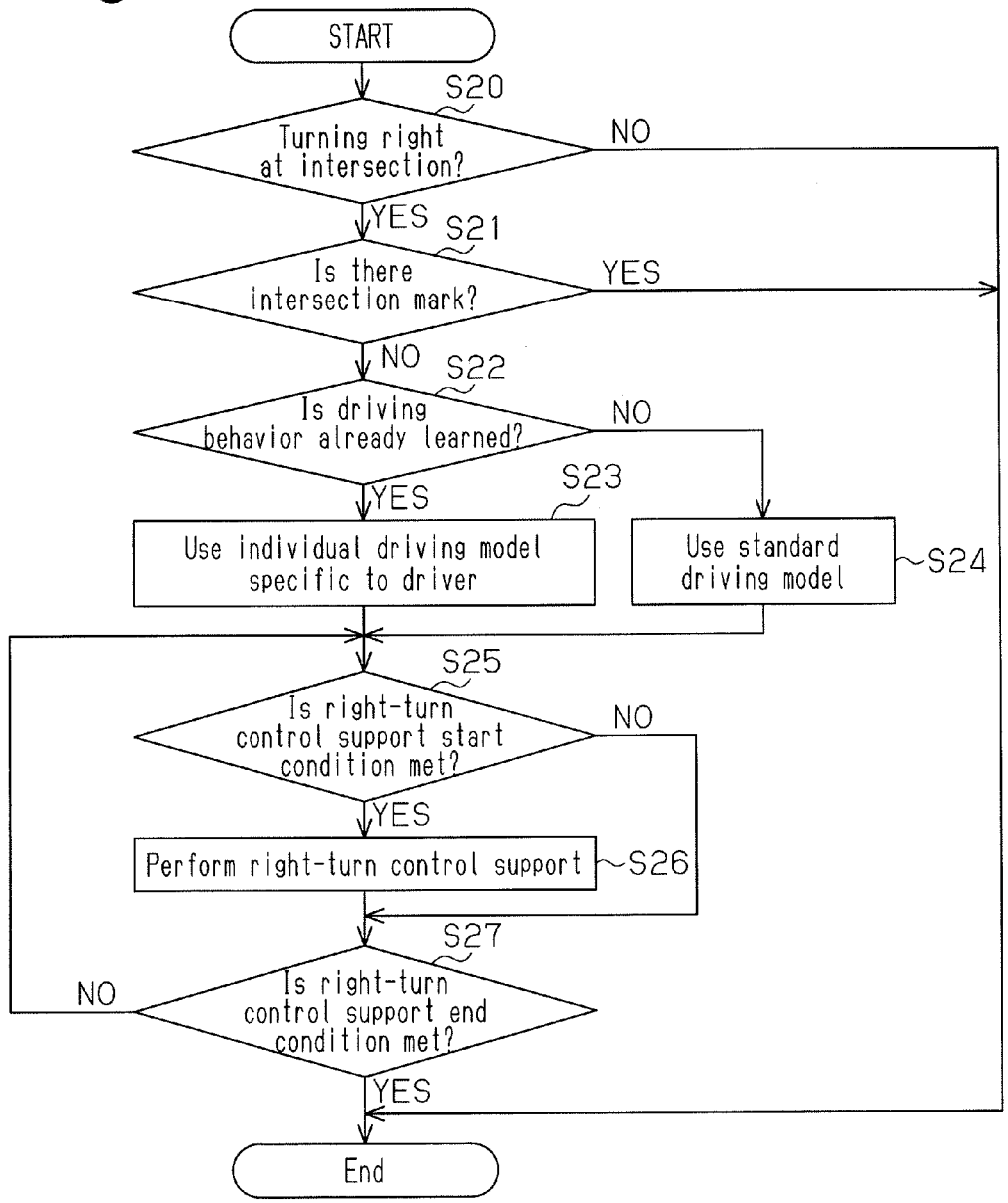
FIG. 10 is a flowchart showing the procedure of the driving support performed on the basis of the driving model in the apparatus of the first embodiment.

Subsequently, the driving support performed by the driving support apparatus of this embodiment will be described by referring to FIGS. 9 and 10. FIG. 9 is a plan view showing the second intersection C2. FIG. 10 is a flowchart showing a support procedure of the driving support.

The driving support is performed as appropriate when the vehicle drives in a driving environment subjected to the driving support on the basis of the road map information and the current position of the vehicle 10, that is, when the vehicle 10 drives in a driving environment for which a driving model has already been prepared. In this embodiment, it is assumed that the vehicle 10 turns right at the first intersection C1 shown in FIG. 4 as an example of an intersection having an intersection mark as indicated by a first trajectory Tr1 from the lane La1 to the lane Ls2 close to the center and also turns right at the second intersection C2 shown in FIG. 9 as an example of an intersection not having an intersection mark as indicated by a second trajectory Tr2 from a first road La11 to a second road Ls11.

As shown in FIG. 10, when the driving support is started, the driving support ECU 11 determines whether or not the vehicle 10 is turning right at the intersection (Step S20 in FIG. 10). The determination that the vehicle 10 is turning right at the intersection is made similarly to Step S11 in FIG. 7. That is, the determination is made on the basis of the facts that the path guidance of the automotive navigation system 20 indicates a right turn, the direction indicator indicates a right turn, the vehicle usually makes a right turn on the path, deceleration is started in a driving environment in which deceleration is not necessary, a form of a driving operation of the driver resembles a standard model at a usual right-turn operation and the like. If the driving support ECU 11 determines that the right turn is not to be made at the intersection (NO at Step S20 in FIG. 10), the driving support ECU 11 ends the driving support.

If the driving support ECU 11 determines that a right turn is to be made at the intersection (YES at Step S20 in FIG. 10), the driving support ECU 11 determines whether or not there is an intersection mark (51) at the intersection (Step S21 in FIG. 10). Whether or not there is the intersection mark (51) at the intersection is determined similarly to Step S12 in FIG. 7, and the determination is made on the basis of the various information obtained from the onboard camera 33, the infrastructure information, and the road map information. Then, if the driving support ECU 11 determines that there is the intersection mark 51 at the intersection from the fact that the driving environment is the first intersection C1 and the like (YES at Step S21 in FIG. 10), the driving support ECU 11 ends the driving support.

On the other hand, if the driving support ECU 11 determines that there is no intersection mark (51) at the intersection from the fact that the driving environment is the second intersection C2 and the like (NO at Step S21 in FIG. 10), the driving support ECU 11 determines whether or not the individual driving model MC2 corresponding to the second intersection C2 has been already learned (Step S22 in FIG. 10). Whether or not the individual driving model MC2 has been already learned is determined on the basis of whether or not the individual driving model corresponding to the driving environment is held in the database 21.

If the driving support ECU 11 determines that the individual driving model MC2 has been already learned (YES at Step S22 in FIG. 10), the driving support ECU 11 uses the individual driving model MC2, which is a driving model specific to the driver as the driving model used for the driving support (Step S23 in FIG. 10). If the driving support ECU 11 determines that the individual driving model MC2 has not been learned yet (NO at Step S22 in FIG. 10), the driving support ECU 11 uses the general driving model (MCu) prepared in advance as a driving model that can be used in the driving environment as the standard driving model and determines this standard driving model as a driving model used for the driving support (Step S24 in FIG. 10). In this embodiment, since the normative driving model (MCs) and the calculated driving model (MCx) are also prepared in advance, these driving models may be used as a standard driving model instead of the general driving model (MCu) by means of selection setting of the standard driving model through the automotive navigation system 20 and the like.

If the driving model to be used is determined, the driving support ECU 11 determines whether or not a right-turn control support start condition is met (Step S25 in FIG. 10). For the determination of the right-turn control support start condition, conditions such that a predetermined time has elapsed since start of the driving support, the speed of the vehicle 10 has fallen to a certain value or less, the accelerator has not been stepped on, a distance to the second intersection C2 has become a certain value or less and the like are used. That is, if one or more of the conditions employed from the above-described conditions are met, the driving support ECU 11 determines that the right-turn control support start condition is met.

If the driving support ECU 11 determines that the right-turn control support start condition is met (YES at Step S25 in FIG. 10), the driving support ECU 11 performs the right-turn control support (Step S26 in FIG. 10). If the right-turn control support is performed, the driving support ECU 11 determines whether or not a right-turn control support end condition is met (Step S27 in FIG. 10). On the other hand, if the driving support ECU 11 determines that the right-turn control support start condition is not met (NO at Step S25 in FIG. 10), the driving support ECU 11 does not perform the right-turn control support but determines whether or not the right-turn control support end condition is met (Step S27 in FIG. 10). Whether or not the right-turn control support end condition is met is determined on the condition that the vehicle has exited the second intersection C2, the accelerator is stepped on for a predetermined value or more, the speed of the vehicle 10 exceeds a predetermined value and the like. That is, if one or more of the conditions employed from the above-described conditions are met, the driving support ECU 11 determines that the right-turn control support end condition is met.

In either case, if the driving support ECU 11 determines that the right-turn control support end condition is not met (NO at Step S27 in FIG. 10), the driving support ECU 11 returns to Step S25 in FIG. 10, determines whether or not the right-turn control support start condition is met, and repeats the subsequent process. On the other hand, if the driving support ECU 11 determines that the right-turn control support end condition is met (YES at Step S27 in FIG. 10), the driving support ECU 11 ends the driving support.

As a result, the driving support can be provided in accordance with the driving environment, specifically when the vehicle drives through the second intersection C2 or the like where the driving state becomes unstable since there is no intersection mark (51), and the driving support is suitably provided on the basis of the selected driving model.

As described above, according to the driving support apparatus of this embodiment, the advantages enumerated as follows are achieved.

(1) The driving support apparatus is configured to create the individual driving model on the basis of the intersection data and the driving information (a learning result is reflected) if there is the intersection mark 51, which is a road marking, at the intersection, and not to create (learn) the individual driving model on the basis of the driving information if there is no intersection mark 51. That is, the "model contribution rate of the driving information", which is a contribution rate of the driving information to the creation of the individual driving model, is configured to be changed in accordance with the intersection data. For example, if there is the intersection mark 51, the "model contribution rate of the driving information" is 100%, while if there is no intersection mark 51, the "model contribution rate of the driving information" is 0%. As a result, the driving support apparatus can be configured such that the driving information in the driving environment determined to be not suitable for creation of the individual driving model since fluctuation in the driving operation of the driver is large (the driving information when there is no intersection mark 51) or the like is not reflected in the individual driving model to be created, for example. That is, the individual driving model can be created as a more suitable model according to the driving environment of a vehicle. Moreover, if the individual driving model created as above is used for the driving support, more suitable driving support can be provided.

(2) Usually, if there is a road marking (intersection mark 51) at an intersection such as in the first intersection C1, the driver performs the driving operation of the vehicle 10 pursuant to the road marking. Thus, the driving state of the vehicle 10 tends to be stable, and the driving information as the information relating to the driving state reflects the stable driving state. In contrast, if there is no road marking (intersection mark 51) at an intersection such as in the second intersection C2, the driver performs the driving operation of the vehicle 10 mainly on the basis of his/her own senses. Thus, the driving state of the vehicle 10 also tends to be unstable, and the driving information as the information relating to the driving state reflects the unstable driving state.

In this regard, according to the above-described configuration, if there is no road marking (intersection mark 51) at an intersection such as in the second intersection C2, the individual driving model is created such that there is no longer contribution by the driving information at that time, that is, the driving information no longer has influence (model contribution rate of the driving information is reduced). From this fact, the accuracy and reliability of the created individual driving model are also improved. As such, by using the highly reliable individual driving model for the driving support, more suitable driving support is provided.

(3) According to the above-described configuration, a highly practical individual driving model is suitably created even for an intersection such as the second intersection C2, where stability or uncertainty of the driving state of the vehicle 10 may be largely fluctuated by the driving operation of the driver. For example, if the information relating to the intersection mark 51 is not included in the intersection data, the accuracy and reliability of the individual driving model created for the second intersection C2 are made higher by eliminating contribution of the driving information to the individual driving model (reducing the model contribution rate of the driving information small).

Then, by using the driving model created as above for the intersection, suitable driving support pursuant to the driving environment of each intersection is provided.

(4) On the basis of the road map information, which is information indicating the driving environment of the vehicle 10, the "support contribution rate of the driving model", which is a contribution rate to the driving support of the individual driving model dependent on the driving operation of the driver, is made variable. Thus, the form of the driving support is also changed in accordance with the road map information, that is, the driving environment of the vehicle 10. Therefore, in the driving environment in which a burden of the driver tends to be large since there is no stop line 54 or intersection mark 51, for example, that is, in the driving environment in which necessity of the driving support is large (the second intersection C2, for example), the support contribution rate of the driving model can be made larger, while in the driving environment in which necessity of the driving support is small (the first intersection C1, for example), the support contribution rate of the driving model can be reduced. As a result, the degree of influence of the driving model in the driving support can be changed in accordance with the driving environment of the vehicle 10. Thus, even if the driving support is given on the basis of the driving model, the freedom thereof is improved.

(5) If there is no road marking (intersection mark 51) at the intersection, the driving model used for the driving support is selected, that is, the support contribution rate of the individual driving model is changed in accordance with presence or absence of the individual driving model created (learned) suitably at that time. Specifically, if there is no individual driving model created (learned) suitably, the standard driving model is used for the driving support, that is, the contribution of the individual driving model is eliminated. As a result, stability of the driving support is improved, and also, more suitable driving support is provided.

(6) If there is no road marking (intersection mark 51) at the intersection, the predetermined stable driving support is provided by performing the driving support on the basis of the standard driving model prepared in advance. Therefore, the stability of the driving support is favorably maintained.

(Second Embodiment)

A driving support apparatus according to a second embodiment of the present invention will be described by referring to FIGS. 11 to 14. The driving support apparatus of this embodiment is different from the above-described first embodiment in the creation process of the individual driving model and procedures relating to the driving support, but the other configurations are similar. Thus, mainly the differences will be described here, and for the illustrative purposes, the same reference numerals are given to the same configurations and the explanation thereof will be omitted.

Figure 11:
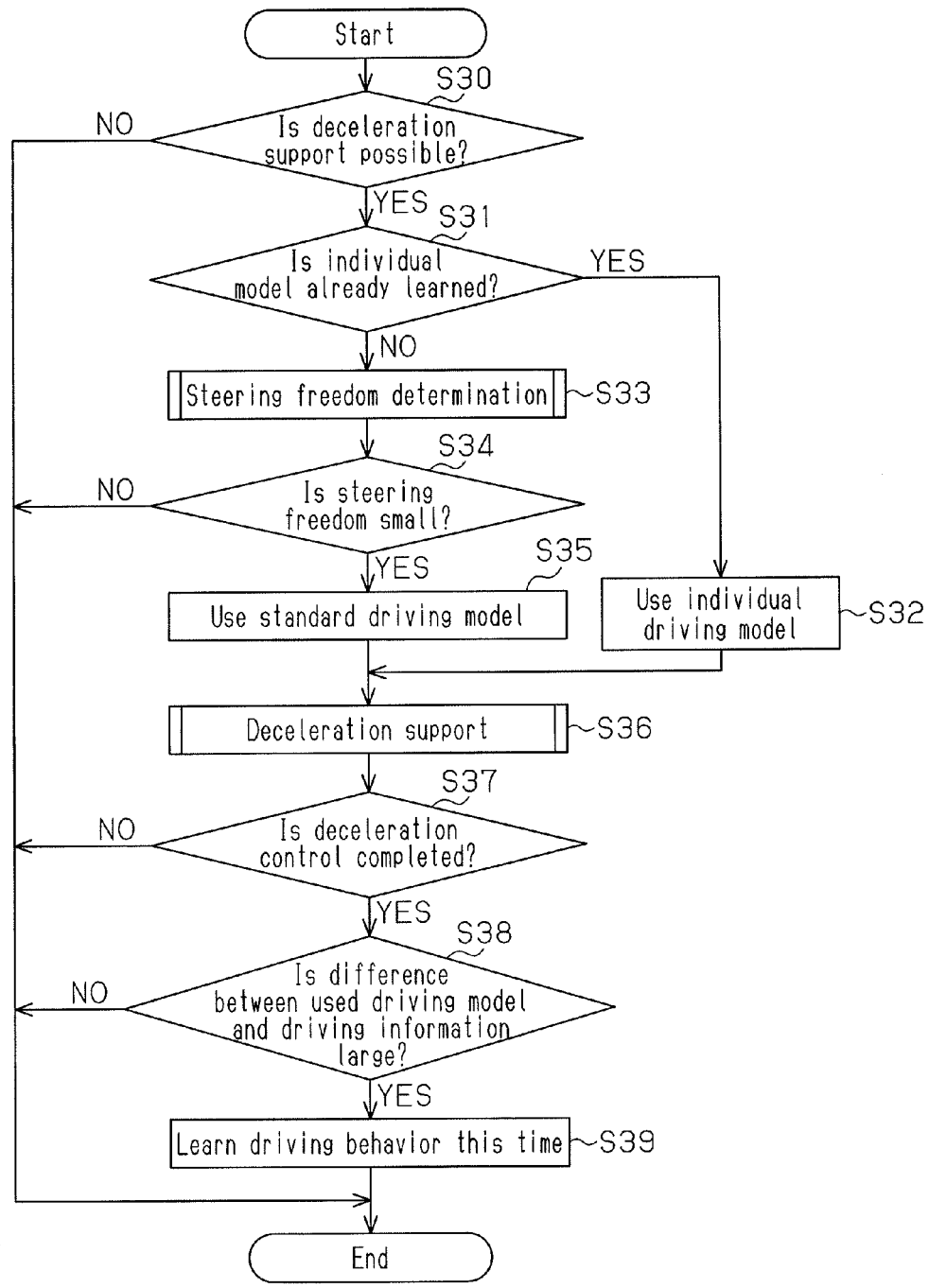
FIG. 11 is a flowchart showing a procedure of driving support of a driving support apparatus according to a second embodiment of the present invention.
Figure 12:
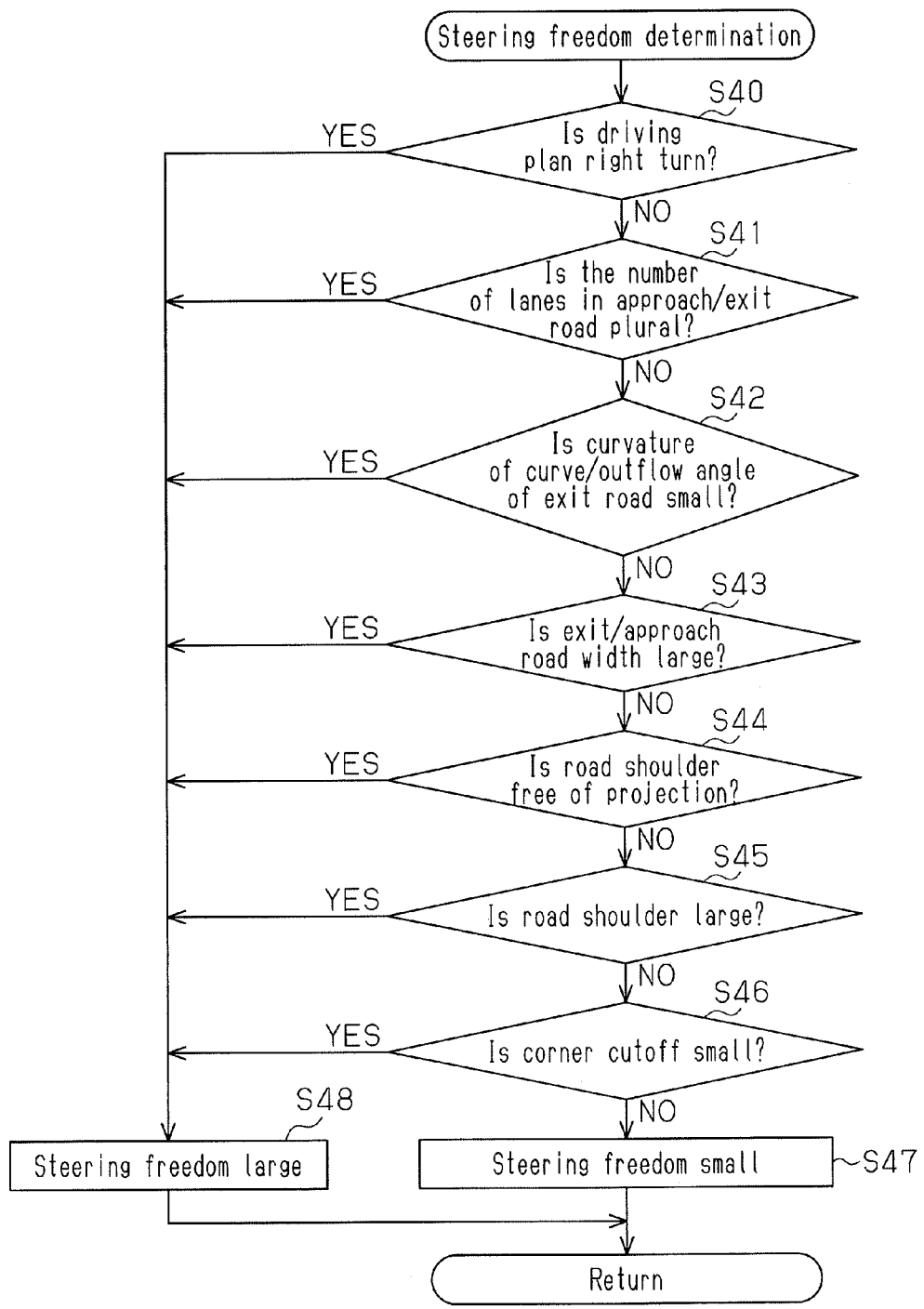
FIG. 12 is a flowchart showing a procedure for determining steering freedom in the driving support of FIG. 11.

FIG. 11 is a flowchart showing a procedure of the driving support of this embodiment. FIG. 12 is a flowchart showing determination process of steering freedom in the driving support. In this embodiment, particularly an example of deceleration support at a right turn will be described as the driving support. The vehicle 10 turns right at the first intersection C1 and the fourth intersection C4 shown in FIG. 13(b) as an example of an intersection with small steering freedom. Moreover, the vehicle 10 turns right at the intersection C3 shown in FIG. 13(a) from a first road La12 toward a second road Ls12 as indicated by a third trajectory Tr3 as an example of an intersection with large steering freedom. That is, since the third intersection C3 has its corners rounded at each of four corners 60a to 60c into an arc shape, the road width from the center of the third intersection C3 to a corner 60d, for example, expands as compared with the case of a corner at a right angle. Thus, the freedom of the third trajectory Tr3, which the vehicle 10 can take when turning right, is large. That is, in this case, the range of selection of the driving operation of the driver is wider, that is, the steering freedom is larger. On the other hand, regarding the fourth intersection C4, if the vehicle 10 turns right from a first road La13 to the second road, the approach destination might be limited to a lane Ls13 close to the road shoulder or the lane Ls14 close to the center of the second road. That is, if a fourth trajectory Tr4, which can be taken at a right turn at the fourth intersection C4, is limited from the beginning, steering freedom is reduced, but if the lane of the approach destination is not limited, the limitation is relaxed, and steering freedom becomes larger.

The driving support of this embodiment is performed as appropriate when the vehicle 10 drives in a driving environment subjected to the driving support on the basis of the road map information and the current position of the vehicle 10, that is, in the driving environment for which the driving model is prepared.

That is, as shown in FIG. 11, when deceleration support as the driving support is started, the driving support ECU 11 determines whether or not the deceleration support is possible (Step S30 in FIG. 11). Whether or not the driving support is possible is determined on the condition that a distance from the current position of the vehicle 10 before entering the intersection to the intersection is within a certain range or the speed of the vehicle 10 is within a certain range. That is, if one or more of conditions selected from the above-described conditions are met, the driving support ECU 11 determines that the deceleration support is possible. If the driving support ECU 11 determines that the deceleration support is not possible (NO at Step S30 in FIG. 11), the driving support ECU 11 ends the driving support.

On the other hand, if the driving support ECU 11 determines that the deceleration support is possible (NO at Step S30 in FIG. 11), the driving support ECU 11 starts temporary storage of the driving information and also determines whether or not the individual driving model has been learned (Step S31 in FIG. 11). Whether or not the individual driving model has been already learned is determined on the basis of whether or not the individual driving model corresponding to the driving environment is held in the database 21 and the like. If the driving support ECU 11 determines that the individual driving model has been already learned (YES at Step S31 in FIG. 11), the driving support ECU 11 sets the individual driving model (MC1), which is being created as a driving model used for the driving support (Step S32 in FIG. 11).

If the driving support ECU 11 determines that the individual driving model has not been learned (NO at Step S31 in FIG. 11), the driving support ECU 11 performs steering freedom determination process (Step S33 in FIG. 11).

In the steering freedom determination process, the driving support EUC 11 determines each conditions of whether the driving plan is a right turn or a left turn (Step S40 in FIG. 12), whether or not the number of lanes in the approach/exit road is plural (Step S41 in FIG. 12), and whether or not the curvature/an outflow angle of exit road of the curve is small (Step S42 in FIG. 12) as necessary. Moreover, the driving support ECU 11 determines each of the conditions of whether or not the exit/approach road width is large (Step S43 in FIG. 12), whether or not the road shoulder is free of projections (Step S44 in FIG. 12), whether or not the road shoulder is wide (Step S45 in FIG. 12), and whether or not the corner cutoff is small (Step S46 in FIG. 12) as necessary. That is, if any one of the above-described plurality of the conditions is determined to be met, process pursuant to "YES" at any of Steps S40 (S41, . . . S46) determined to be met is proceeded, and the driving support ECU 11 sets that "steering freedom is large" (Step S48 in FIG. 12). Then, the steering freedom determination process at Step S33 in FIG. 11 is finished.

On the other hand, if all the conditions in the above-described plurality of conditions are determined to be false, that is, if process pursuant to "NO" is proceeded at all the Steps S40 to S46, the driving support ECU 11 sets that "steering freedom is small" (Step S47 in FIG. 12). Then, the steering freedom determination process at Step S33 in FIG. 11 is finished.

When the steering freedom determination process is finished, the driving support ECU 11 determines whether or not the steering freedom is small (Step S34 in FIG. 11). Whether or not the steering freedom is small is determined on the basis of the steering freedom set in the steering freedom determination process. That is, if it is set that "steering freedom is small" in the steering freedom determination process, the driving support ECU 11 determines that the steering freedom is small, while if it is set that "steering freedom is large", the driving support ECU 11 determines that the steering freedom is not small.

If the driving support ECU 11 determines that the steering freedom is not small (NO at Step S34 in FIG. 11), the driving support ECU 11 stops temporary storage of the driving information, discards the stored driving information and then, ends the driving support process.

On the other hand, if the driving support ECU 11 determines that the steering freedom is small (YES at Step S34 in FIG. 11), the driving support ECU 11 sets the general driving model (MCu) prepared in advance as the standard driving model, which is a driving model used for the driving support (Step S35 in FIG. 11). In this embodiment, since the normative driving model (MCs) and the calculated driving model (MCx) are also prepared in advance, these driving models may be used as a standard driving model instead of the general driving model (MCu) by means of selection setting of the standard driving model through the automotive navigation system 20.

If the driving model used for the deceleration support is determined, the deceleration support process is performed (Step S36 in FIG. 11).

In the deceleration support process, the driving support ECU 11 clears a flag indicating a result of the deceleration support to "0" and determines whether or not the deceleration support start condition is met (Step S50 in FIG. 14). Whether or not the deceleration support start condition is met is determined on the basis of the facts that expected arrival time at the intersection is a predetermined time T [seconds] or less, deceleration (deceleration G) required for the speed to decelerate to a predetermined speed to a stop line is a predetermined value X [G] (where, 1G=9.8 kg·m/s$^2$) or more, the distance to the intersection is a predetermined distance L [m] or less and the like. The predetermined time T [seconds], the predetermined value X[G], and the predetermined distance L[m] may be set in advance in the database 21 or may be calculated by the driving support ECU 11 as necessary. That is, if one or more of the conditions selected from the above-described conditions are met, the deceleration support start condition is met.

If the driving support ECU 11 determines that the deceleration support start condition is not met (NO at Step S50 in FIG. 14), the driving support ECU 11 determines whether or not the deceleration support is possible (Step S51 in FIG. 14). Whether or not the deceleration support is possible is determined on conditions that the distance to the intersection is within a certain range, the speed of the vehicle 10 is within a certain range and the like similarly to Step S30 in FIG. 11. If the driving support ECU 11 determines that the deceleration support is possible (YES at Step S51 in FIG. 14), the driving support ECU 11 returns to Step S50 in FIG. 14 and repeats the process at the determination on whether or not the deceleration support start condition is met and proceeding process. On the other hand, if the driving support ECU 11 determines that the deceleration support is not possible (NO at Step S51 in FIG. 14), the deceleration support process at Step S36 in FIG. 11 is finished.

On the other hand, if the driving support ECU 11 determines that the deceleration support start condition is met (YES at Step S50 in FIG. 14), the driving support ECU 11 performs the deceleration support (Step S53 in FIG. 14) and also determines whether or not a support end condition is met (Step S54 in FIG. 14). Whether or not the support end condition is met is determined on the facts that the intersection has been passed, the speed of the vehicle 10 is at a certain speed or less, the steering wheel is turned to the left by a predetermined angle or more and the like. That is, if one or more of the conditions selected from the above-described conditions are met, the support end condition is met.

If the driving support ECU 11 determines that the support end condition is not met (NO at Step S54 in FIG. 14), the driving support ECU 11 returns to Step S53 in FIG. 14 and repeats the process of performance of the deceleration support and the proceeding process. On the other hand, if the driving support ECU 11 determines that the support end condition is met (YES at Step S54 in FIG. 14), the driving support ECU 11 sets a value indicating that the deceleration support is completed or the value of "1", for example, to a flag indicating the support result and ends the deceleration support and also ends the deceleration support process at Step S36 in FIG. 11.

If the deceleration support process is finished, the driving support ECU 11 ends the temporary storage of the driving information and also determines whether or not the deceleration support is completed (Step S37 in FIG. 11). Whether or not the deceleration support is completed is determined on the basis of whether the value "1" indicating that the deceleration control is completed is set for the flag indicating the result of the deceleration support. That is, if the value "1" indicating that the deceleration support is completed is set for the flag indicating the result of the deceleration support, the driving support ECU 11 determines that the deceleration support is completed.

If the driving support ECU 11 determines that the deceleration support is completed (YES at Step S37 in FIG. 11), the driving support ECU 11 determines whether or not the difference between the used driving model and the driving information of the vehicle 10 is large (YES at Step S38 in FIG. 11). Whether or not the difference between the used driving model and the driving information of the vehicle 10 is large may be determined on the conditions of whether there is a difference of a predetermined threshold value or more in deceleration timing (position, time required to reach the intersection and the like)/deceleration of the vehicle 10, whether there is a difference of a predetermined threshold value or more in acceleration timing (position, time required to reach the intersection and the like)/acceleration of the vehicle 10. Moreover, whether or not the difference between the used driving model and the driving information of the vehicle 10 is large may be determined on the conditions of whether there is a difference of a predetermined threshold value or more in an approaching speed, whether there is a difference of a predetermined threshold value or more in a steering operation position (turning start, return start, and return end of the steering wheel) and a steering operation amount and the like. Furthermore, whether or not the difference between the used driving model and the driving information of the vehicle 10 is large may be determined on the conditions of whether or not an acceleration/deceleration operation (operation of stepping on the brake pedal or the accelerator pedal twice and the like) has been performed, whether the steering operation (turning back of steering wheel or the like) has been performed plural times. That is, if one or more of the conditions selected from the above-described conditions are met, the driving support ECU 11 determines that the difference between the used driving model and the driving information of the vehicle 10 is large.

If the driving support ECU 11 determines that the difference between the used driving model and the driving information of the vehicle 10 is large (YES at Step S38 in FIG. 11), the driving support ECU 11 performs learning of an individual driving model on the basis of the driving information of the vehicle 10 this time (Step S39 in FIG. 11). As a result, the value obtained by learning the driving information this time is reflected in the value of each item of the individual driving model. Then, the driving information temporarily stored is discarded, and the driving support is finished.

On the other hand, if the driving support ECU 11 determines that the deceleration support is not completed (NO at Step S37 in FIG. 11) or if the driving support ECU 11 determines that the difference between the used driving model and the driving information of the vehicle 10 is not large (NO at Step S38 in FIG. 11), the driving support ECU 11 does not perform learning process of the individual driving model but discards the temporarily stored driving information and ends the driving support.

As a result, provision of suitable driving support and efficient learning of the individual driving model used for the driving support is performed.

As described above, with the driving support apparatus of this embodiment, the advantages equal to or substantially equal to the advantage (4) of the above-described first embodiment are achieved. Moreover, the following advantages are achieved.

(7) The individual driving model is created (the learning result is reflected) on the conditions of the intersection data, the steering freedom determined on the basis of the intersection data, and the difference between the driving model used for the driving support and the driving information of the vehicle 10 at that time. That is, the model contribution rate of the driving information to creation of the individual driving model is changed in accordance with the intersection data and the difference between the driving model used for the support and the stored driving information. As a result, if the learning effect is low since the driving operation of the driver is not much fluctuated, for example, it may be so configured that the driving information is not reflected in the individual driving model. That is, the individual driving model is created efficiently.

(8) If the steering operation freedom is small such as when the road width is small, for example, the driver performs the driving operation of the vehicle within a limited steering operation range, and thus the driving operation of the vehicle tends to be stable. That is, the difference in the driving information as information relating to the driving state generated between the driving operations is small.

Thus, as according to this configuration, if the steering operation freedom is small and also if the difference between the driving model selected as a model corresponding to the intersection, which is the driving environment and the driving information, is small, the contribution by the driving information is eliminated (the model contribution rate of the driving information is reduced) when the individual driving model is created (the learning result is reflected). Accordingly, the driving model with a low learning effect in which accuracy and the like are already maintained is not affected by the driving information more than necessary. As a result, accuracy and reliability of the individual driving model to be created is maintained. By using such highly reliable individual driving model for the driving support, suitable driving support is provided.

Particularly, if there is no contribution (the model contribution rate of the driving information is "0 (zero)"), the driving information does not contribute to the creation of the individual driving model. Thus, calculation process required for the creation of the individual driving model with the low learning effect and a storage region for storing the created individual driving model are reduced, thereby improving efficiency of the creation process of the individual driving model.

(9) A highly practical individual driving model is suitably created for an intersection with a great possibility that stability and uncertainty of the driving state of the vehicle 10 might be largely fluctuated by the driving operation of the driver. For example, by configuring such that the driving information does not make contribution (the model contribution rate of the driving information is made variable) when it is indicated that the steering operation freedom by the driver is small, accuracy and reliability of the driving model for the intersection is maintained, and calculation required for creation of the driving model and the like are reduced.

(10) As described above, if the steering operation freedom is small such as when the road width is small and the like, for example, the driver usually performs a driving operation of the vehicle within a limited steering operation range. Therefore, the driving operation of the vehicle tends to be stable, and the difference in the driving state of the vehicle between the driving operations is small. In contrast, if the steering operation freedom is large such as when the road width is large, for example, the driver performs the driving operation of the vehicle freely in a wide steering operation range. Therefore, the driving state of the vehicle tends to be unstable, and it is highly likely that a large difference is generated in the driving state of the vehicle between the driving operations.

Thus, if the steering operation freedom is small, the driving support is performed by using the standard driving model under the condition that the individual driving model has not been learned, that is, with smaller support contribution rate by the individual driving model. As a result, when the driving operation of the vehicle by the driver is stable since the steering operation freedom is small, the driving support is performed in the form that does not become a nuisance to the driving operation of the driver. That is, suitable driving support is provided to the driver.

(11) If the steering operation freedom is small, that is, if the difference in the driving state between the driving operations is small, stable driving support without characteristics specific to the driver is provided by performing the driving support on the basis of the standard driving model prepared in advance under the condition that the individual driving model has not been learned.

(Third Embodiment)

A driving support apparatus according to a third embodiment of the present invention will be described by referring to FIGS. 15 to 16. The driving support apparatus of this embodiment is different from the above-described second embodiment in the steering freedom determination process but the other configurations are similar. Thus, the differences will be mainly described here, and for the illustrative purposes, the same reference numerals are given to the same configurations and the explanation thereof will be omitted. The driving support of this embodiment may be applied not only to a right turn but also for the driving support and the like for a left turn.

In the steering freedom determination process, the driving support ECU 11 determines whether or not an exit direction from the current path of the vehicle 10 is right (Step S60 in FIG. 16). The determination on whether or not the vehicle 10 is turning right at the intersection is made similarly to Step S11 in FIG. 7. That is, it is determined on the facts that the path guidance of the automotive navigation system 20 indicates a right turn, the direction indicator indicates a right turn, the vehicle usually makes a right turn on the path, deceleration is started in a driving environment in which deceleration is not necessary, a form of a driving operation of the driver resembles a standard model at a right-turn operation and the like.

If the driving support ECU 11 determines that the exit direction of the vehicle 10 is right (YES at Step S60 in FIG. 16), the driving support ECU 11 determines whether or not the number of lanes on one side of the exit road is 2 or more (Step S61 in FIG. 16). Whether or not the number of lanes on one side of the exit road is 2 or more is determined from the intersection data. If the driving support ECU 11 determines that the number of lanes on one side of the exit road (including the lane Ls13 close to the road shoulder and the lane Ls14 close to the center) is 2 or more as at the fourth intersection C4 (See FIG. 13 (b)) (YES at Step S61 in FIG. 16), the driving support ECU 11 determines that the steering freedom is large, and the steering freedom determination process at Step S33 in FIG. 11 is finished, for example.

In contrast, if the driving support ECU 11 determines that the number of lanes on one side of the exit road is less than 2, that is, one lane (NO at Step S61 in FIG. 16), the driving support ECU 11 determines that the steering freedom is small and finishes the steering freedom determination process at Step S33 in FIG. 11, for example.

On the other hand, if the driving support ECU 11 determines that the exit direction of the vehicle 10 is not right (right turn), that is, the exit direction is left (left turn) as at the fifth intersection C5 shown in FIG. 15 (NO at Step S60 in FIG. 16), the driving support ECU 11 determines whether or not the exit lane position of the exit road is close to the center line (far side) of the exit road, for example, a lane LS16 close to the center of the exit road (Step S64 in FIG. 16). If the driving support ECU 11 determines that the exit lane is close to the center line, that is, the lane Ls16 close to the center (YES at Step S64 in FIG. 16), the driving support ECU 11 determines that the steering freedom is large and finishes the steering freedom determination process at Step S33 in FIG. 11, for example.

In contrast, if the driving support ECU 11 determines that the exit lane is not close to the center line of the exit road, that is, the exit lane is a lane Ls15 close to the road shoulder (NO at Step S64 in FIG. 16), the driving support ECU 11 determines that the steering freedom is small since the vehicle cannot enter the lane Ls15 close to the road shoulder unless the steering is operated larger than the case of the lane Ls16 close to the center. Then, the steering freedom determination process at Step S33 in FIG. 11 is finished.

As a result, provision of suitable driving support and efficient learning of an individual driving model used for the driving support are realized.

As described above, with the driving support apparatus of this embodiment, the advantages equal to or substantially equal to the advantages (4) and (7) to (11) of the above-described first and second embodiments are achieved and moreover, the following advantages are achieved.

(12) The determination of the steering freedom of the vehicle 10 when turning right or left at an intersection is made suitably. As a result, the driving support provided on the basis of the steering freedom is provided suitably.

Each of the above-described embodiments may be put into practice in the following forms, for example.

In each of the above-described embodiments, the example in which the road map information used for the navigation process and the like is stored in the HDD is illustrated. However, not limited to that, the road map information may be stored in a storage medium such as a CD-ROM (Compact Disk ROM), a DVD (Digital Versatile Disk) and the like instead of or in addition to the HDD. The road map information stored in these storage mediums and the like can be read through a drive device (not shown), and thus, the road map information according to need can be obtained by setting the storage medium in the drive device.

In each of the above-described embodiments, the example in which the automotive navigation system 20 sends/receives map information and the like to/from the database 21 is illustrated. However, not limited to that, the automotive navigation system may have a database for storing the map information and the like. Moreover, the automotive navigation system 20 and the database 21 may directly communicate with each other.

In each of the above-described embodiments, the example in which the infrastructure communication device 31 conducts optical communication with the optical beacon device is illustrated. However, not limited to that, the infrastructure communication device may conduct wireless communication with another beacon device or VICS center or the like. Moreover, the infrastructure communication device may be provided separately; one for the beacon device and one for VICS center, and only either one of the one for the beacon device and the one for VICS center may be provided as long as necessary information is obtained.

In each of the above-described embodiments, the example in which the driving support ECU 11 performs the creation process of the individual driving model and the driving support is illustrated. However, not limited to that, the driving support apparatus may be configured to perform only either one of the creation process of the individual driving model and various controls relating to the driving support. For example, if the driving support ECU performs only the creation process of the individual driving model, it functions as a driving model creation apparatus that can create a suitable individual driving model according to the driving environment. Moreover, for example, if the driving support ECU performs the various controls relating to the driving support on the basis of the driving model, it functions as a driving support apparatus that can provide suitable driving support on the basis of the driving model in accordance with the driving environment. As a result, freedom in performance of the creation process of the individual driving model or the driving support on the basis of the driving model is improved, respectively.

In each of the above-described embodiments, the example in which the driver is identified by setting the driver by using the automotive navigation system 20 is illustrated. However, not limited to that, the driver may be identified on the basis of information of an electronic key and the like. That is, the information of the driver to be identified by an ID of an electronic key on the basis of the information set in advance may be used in the driving support ECU. As a result, an identification work of the driver required for the creation process of the individual driving model or the driving support using the individual driving model is facilitated.

In FIG. 5 of each of the above-described embodiments, the items of the intersection data 51A are exemplified, but a part of the exemplified items of the items of the intersection data does not have to be provided or another item may be included as long as the creation process of the individual driving model or performance of the driving support is not obstructed. As a result, design freedom of the intersection data is improved.

In FIG. 3 of each of the above-described embodiments, the example in which the individual driving models MC1 to MC6 are created for each of the intersections C1 to C6 is illustrated. However, not limited to that, the same individual driving model may be shared by the intersections classified as the same intersection by the intersection category by utilizing the intersection categories. As a result, the number of the individual driving models can be reduced, and reduction of the storage capacity of the database and the like can be realized.

Similarly, regarding the normative driving model MCs, the general driving model MCu, and the calculated driving model MCx in FIG. 6, the same driving model may be used for each of the intersections classified as the same intersection by the intersection category. As a result, the number of the individual driving models can be reduced, and reduction of the storage capacity of the database and the like can be realized.

In the above-described embodiments, the example in which the normative driving model MCs or the like is used as a driving model prepared in advance. However, not limited to that, a driving model used for driving support for fuel-efficient driving or for "ecology-conscious driving" may be included as the driving model prepared in advance. As a result, the types of the driving models used for the driving support increases, and freedom and convenience of the driving support are improved.

FIG. 3 in each of the above-described embodiments illustrates a case where the intersection category is included in the intersection list 50 as an example, but not limited to that, the intersection category does not have to be included.

In each of the above-described embodiments, the example in which the creation process of the individual driving model and provision of the driving support for an intersection are performed is illustrated. However, not limited to that, the creation process of the individual driving model may be performed or the driving support may be provided for a curve, which is a driving environment in which the driving information of a vehicle is largely fluctuated. As a result, probability of application of the creation process of the individual driving model or provision of the driving support in the driving environment of a vehicle are improved. Then, the targets to which the driving support apparatus is applied are expanded, whereby the convenience and freedom are improved.

In each of the above-described embodiments, the case in which either of the individual driving model or the standard driving model is selected and used for the driving support is illustrated. However, not limited to that, the individual driving model and the standard driving model may be used at the same time for the driving support. For example, a driving model obtained by synthesizing the individual driving model and the standard driving model at a predetermined ratio may be used for the driving support. In this case, when the driving model to be used for the driving support is set, the support contribution rate of the individual driving model and the support contribution rate of the standard driving model are calculated respectively as shown in FIG. 17 (Step S70 in FIG. 17). Then, the driving model obtained by synthesizing the standard driving model at the ratio corresponding to the calculated support contribution rate (Step S71 in FIG. 17) and the individual driving model at a ratio corresponding to the calculated support contribution rate (Step S72 in FIG. 17) may be created (Step S73 in FIG. 17).

The support contribution rate of the driving model may be reduced if the degree of learning of the individual driving model is low or may be made larger if the degree of learning of the individual driving model is high. Moreover, the support contribution rate of the driving model may be reduced if the degree of similarity of the standard driving model to the driving environment is low or may be made larger if the degree of similarity is high. The support contribution rate of each driving model may be calculated under any condition as long as a driving model suitable for the driving support can be calculated. That is, the support contribution rate of the driving model may be changed finely to an arbitrary value between 0% and 100%.

As a result, design freedom of the driving model used for the driving support is markedly improved, and the driving support is also provided more suitably.

According to the above-described first embodiment, the example in which the driving model is learned if there is the intersection mark 51 is illustrated. However, not limited to that, the learning process of the driving model may be performed on condition of arbitrary one of or combination of two or more of road markings such as the intersection mark, the right-turn auxiliary line, the center line, the stop line, the traffic lane line, the pedestrian crossing and the like. As a result, the design freedom of the learning process of the driving model is improved.

Moreover, if a plurality of conditions are used for the learning process of the driving model, the ratio of the driving information reflected in the learning, that is, the model contribution rate of the driving information may be changed to finer numerical values (an arbitrary value between 0% and 100%) on the basis of the number of satisfied conditions or weight of each condition. For example, if many conditions are satisfied, the model contribution rate of the driving information may be made larger, while if fewer conditions are satisfied, the model contribution rate of the driving information may be reduced. The support contribution rate of the driving model may be changed finely to an arbitrary value between 0% to 100%.

As a result, the individual driving model whose model contribution rate of the driving information is made variable is created in accordance with the information of the road marking included in the intersection data as the road information. As a result, regarding the driving information in the driving environment that is determined to be not suitable for creation of the individual driving model since fluctuation in the driving operation of the driver is large, the model contribution rate of the driving information may be lowered while fine numerical values are set so as to reduce the degree of influence and the like. That is, the individual driving model can be created as a model more suitable for the driving environment of the vehicle and more suitable driving support can be provided by means of this individual driving model.

DESCRIPTION OF THE REFERENCE NUMERALS

10 vehicle
11 driving support control computer (driving support ECU)
12 brake control computer (brake ECU)
13 engine control computer (engine ECU)
14 steering control computer (steering ECU)
20 automotive navigation system
21 database
25 speaker
30 inter-vehicle communication device
31 infrastructure communication device
32 global positioning system (GPS)
33 onboard camera
34 onboard radar
40 vehicle-speed sensor
41 acceleration sensor
42 gyro sensor
43 brake sensor
44 accelerator sensor
45 steering angle sensor
50 intersection list
51 intersection mark
51A intersection data
52 right-turn auxiliary line
53 center line
54 stop line
55 pedestrian crossing
56 center line
57 traffic lane line
60a to 60d corner
110 driving information process unit
111 individual driving model creation process unit
112 driving support performing unit
210 driving information storage unit
211 driving model storage unit
C1 to C6 intersection
R1 road
R2 road
MC1 to MC6 individual driving model
MC1a individual driving model
MCs normative driving model
MCu general driving model
MCx calculated driving model

The invention claimed is:

1. A driving model creating apparatus for creating a driving model indicating a driving state of a vehicle, the apparatus comprising:
a driving support control computer configured to create the driving model on the basis of road information, which is information relating to the driving environment of the vehicle, and driving information, which is information relating to changes in the driving state of the vehicle as a result of a driving operation of a driver, and wherein
the driving support control computer is configured to make a model contribution rate of the driving information, which is a contribution rate of the driving information to the driving model to be created, variable in accordance with the road information,
the driving support control computer is configured to make the model contribution rate of the driving information when information relating to a road marking on a road surface is not included in the road information smaller than the model contribution rate of the driving information when the information relating to the road marking is included in the road information, wherein
the driving support control computer is configured to make the driving information as information relating to the driving state reflects the stable driving state when the information relating to the road marking is included in the road information.

2. The driving model creating apparatus according to claim 1, wherein
the driving support control computer is configured to treat the road information as information relating to an intersection.

3. A driving support apparatus for supporting a driving operation of a driver of a vehicle on the basis of a driving model indicating a driving state of the vehicle, wherein the apparatus comprising a driving support control computer configured to use, as the driving model, a model created by the model creating apparatus according to claim 1.

4. A driving model creating apparatus for creating a driving model indicating a driving state of a vehicle, the apparatus comprising:
a driving support control computer configured to create the driving model on the basis of road information, which is information relating to the driving environment of the vehicle, and driving information, which is information relating to changes in the driving state of the vehicle as a result of a driving operation of a driver, and wherein
the driving support control computer is configured to make a model contribution rate of the driving information, which is a contribution rate of the driving information to the driving model to be created, variable in accordance with the road information, wherein
the driving support control computer is configured to make the model contribution rate of the driving information is configured to be reduced when the road information indicates a driving environment in which freedom in a steering operation by the driver is smaller than a first threshold value and the difference between the driving model selected as corresponding to the driving environment and the driving information is smaller than a second threshold value, wherein
the driving support control computer is configured to make a difference in the driving information as information relating to a driving state generated between driving operations is smaller than a third threshold value based on the driving operation of the vehicle within a limited steering operation range and the driving operation of the vehicle tends to be stable.

5. A driving support apparatus for supporting a driving operation of a driver of a vehicle on the basis of a driving model indicating a driving state of the vehicle, the apparatus comprising:
a driving support control computer configured to create the driving model on the basis of changes in the vehicle driving state as a result of the driving operation of the driver, and
the driving support control computer configured to make a support contribution rate of the driving model, which is a contribution rate of the driving model to the driving support, variable on the basis of road information, which is information indicating the vehicle driving environment, wherein
the driving support control computer is configured to make the support contribution rate of the driving model when information relating to a road marking on a road surface is not included in the road information smaller than the support contribution rate of the driving model when the information relating to the road marking is included in the road information, wherein
the driving support control computer is configured to make the driving information as information relating to the driving state reflects the stable driving state when the information relating to the road marking is included in the road information.

6. The driving support apparatus according to claim 5, wherein the driving support control computer performing circuit is configured to treat the road information as information relating to an intersection.

7. A driving support apparatus for supporting a driving operation of a driver of a vehicle on the basis of a driving model indicating a driving state of the vehicle, the apparatus comprising:
a driving support control computer configured to create the driving model on the basis of changes in the vehicle driving state as a result of the driving operation of the driver, and
the driving support control computer configured to make a support contribution rate of the driving model, which is a contribution rate of the driving model to the driving support, variable on the basis of road information, which is information indicating the vehicle driving environment, wherein
the driving support control computer is configured to provide the driving support on the basis of a standard driving model prepared in advance when the information relating to a road marking on a road surface is not included in the road information,
wherein the driving support control computer is configured to provide the driving support in which predetermined stability is maintained on the basis of the standard driving model prepared in advance when the information relating to the road marking on the road surface is not included in the road information.

8. A driving support apparatus for supporting a driving operation of a driver of a vehicle on the basis of a driving model indicating a driving state of the vehicle, the apparatus comprising:
a driving support control computer configured to create the driving model on the basis of changes in the vehicle driving state as a result of the driving operation of the driver, and the driving support control computer configured to make a support contribution rate of the driving model, which is a contribution rate of the driving model to the driving support, variable on the basis of road information, which is information indicating the vehicle driving environment, wherein the driving support control computer is configured to make the support contribution rate of the driving model when the road information indicates a driving environment in which freedom of a steering operation by a driver is smaller than a first threshold value smaller than that when the support contribution rate of the driving model indicates a driving environment in which the freedom of the steering operation is larger than the first threshold value, wherein the driving support control computer is configured to make a difference in the driving information as information relating to a driving state generated between driving operations is smaller than a second threshold value based on the driving operation of the vehicle within a limited steering operation range and the driving operation of the vehicle tends to be stable.

9. A driving support apparatus for supporting a driving operation of a driver of a vehicle on the basis of a driving model indicating a driving state of the vehicle, the apparatus comprising:

a driving support control computer configured to create the driving model on the basis of changes in the vehicle driving state as a result of the driving operation of the driver, and a driving support control computer configured to make a support contribution rate of the driving model, which is a contribution rate of the driving model to the driving support, variable on the basis of road information, which is information indicating the vehicle driving environment, wherein the driving support control computer is configured to provide the driving support on the basis of a standard driving model prepared in advance when the road information indicates a driving environment in which the freedom of the steering operation by the driver is smaller than a first threshold value wherein the driving support control computer is configured to provide a stable driving support without characteristics unique to the driver on the basis of the standard driving model prepared in advance by making a difference generated in the driving state between the driving operations smaller than a second threshold value.

\* \* \* \* \*